United States Patent [19]
Terane

[11] Patent Number: 5,905,813
[45] Date of Patent: May 18, 1999

[54] IMAGE CODING APPARATUS FOR COMPRESSING IMAGE DATA

[75] Inventor: Hideyuki Terane, Hyogo, Japan

[73] Assignees: Mitsubishi Denki Kabushiki Kaisha, Tokyo; Mitsubishi Electric Semiconductor Software Co. Ltd., Hyogo, both of Japan

[21] Appl. No.: 08/866,258

[22] Filed: May 30, 1997

[30] Foreign Application Priority Data

Jan. 10, 1997 [JP] Japan ...................................... 9-002962

[51] Int. Cl.[6] .................................. G06K 9/36; G06K 9/46
[52] U.S. Cl. .......................... 382/239; 382/232; 382/248; 382/250
[58] Field of Search ...................................... 382/232, 239, 382/250, 248, 251; 358/261.2, 432, 261.3, 430, 433; 348/403, 404

[56] References Cited

U.S. PATENT DOCUMENTS 5,301,032 4/1994 Hong et al. ........................... 358/261.2

FOREIGN PATENT DOCUMENTS 5316496 11/1993 Japan .............................. H04N 7/133

*Primary Examiner*—Jose L. Couso
*Assistant Examiner*—Dmitry A. Novik
*Attorney, Agent, or Firm*—Leydig, Voit & Mayer

[57] ABSTRACT

A data processor in an image coding apparatus includes a zero detecting circuit for determining if the quantized AC coefficients are zero or not; a counter, that is reset periodically, for counting the quantized AC coefficients that are not zero; a comparator for comparing the count of the counter and a first reference value, and outputting an AC coefficient eliminating signal when the count exceeds the first reference value; and a first logic circuit for forcibly replacing the quantized AC coefficients with zero based on the AC coefficient eliminating signal so that the volume of data of the quantized AC coefficients that are not zero is reduced. The image coding apparatus cuts off some portions for the images having a large volume of codings, and keeps the volume of data below a predetermined maximum.

16 Claims, 29 Drawing Sheets

FIG. 3A CLK

FIG. 3B RSYNC0

FIG. 3E COM1

FIG. 3F LOG1

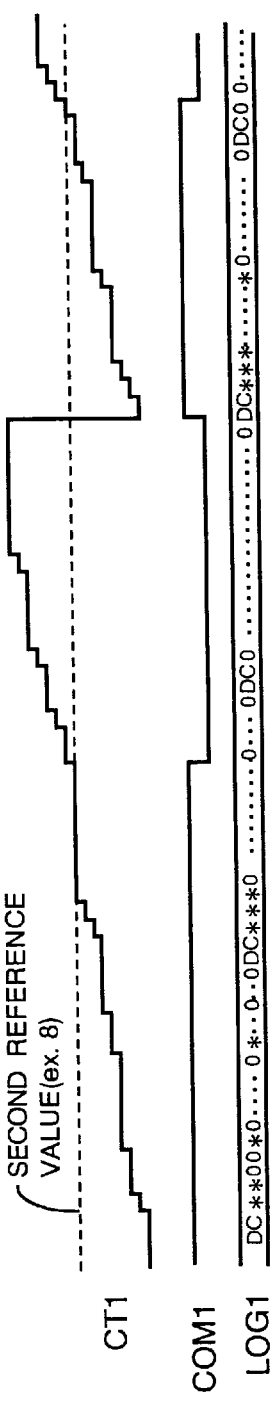

FIG. 7A CLK
FIG. 7B RSYNC0
FIG. 7C DO
FIG. 7D CT1
FIG. 7E COM1
FIG. 7F CT2
FIG. 7G COM2
FIG. 7H LOG2
FIG. 7I LOG1

FIG. 13A CLK

FIG. 13B RSYNCO

FIG. 13C MSYNCO

FIG. 13F LSD

FIG. 13G LOG1

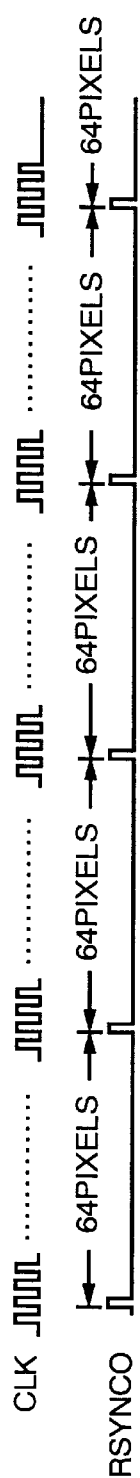
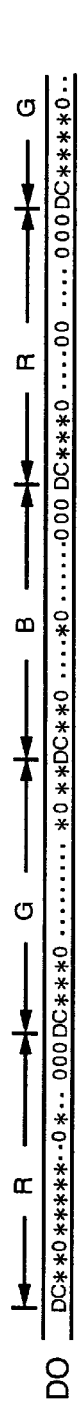
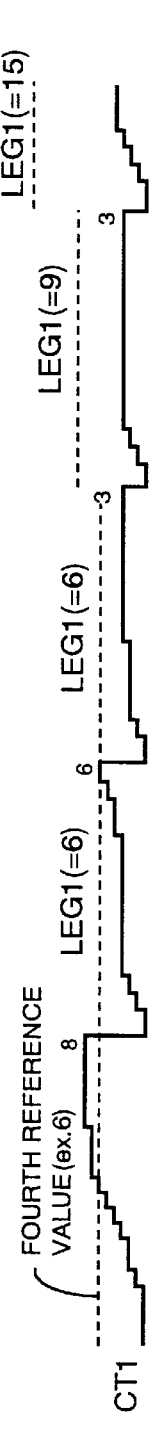
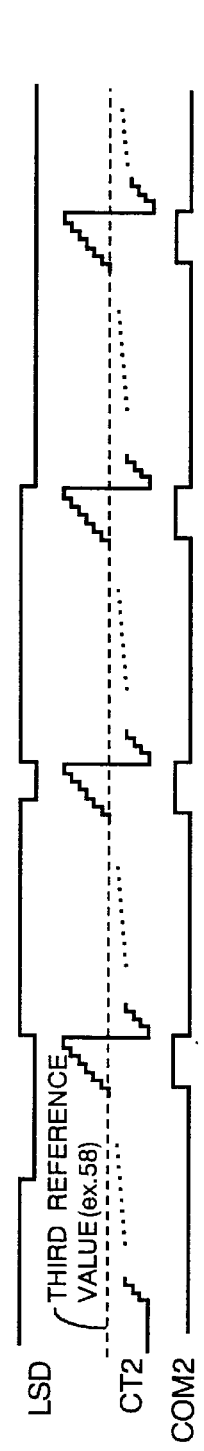

FIG. 17A CLK
FIG. 17B RSYNCO
FIG. 17C MSYNCO
FIG. 17D DO
FIG. 17E CT1
FIG. 17F LSD
FIG. 17G CT2
FIG. 17H COM2
FIG. 17I LOG2
FIG. 17J LOG1

GROUPING TABLE OF DIFFERENCE VALUE OF DC COEFFICIENTS

| GROUP NUMBER(S) | DIFFERENCE VALUE OF DC COEFFICIENTS | ADDED BIT NUMBER (A) |
|---|---|---|
| 0 | 0 | 0 |
| 1 | -1, 1 | 1 |
| 2 | -3, -2, 2, 3 | 2 |
| 3 | -7,....., -4, 4,....., 7 | 3 |
| 4 | -15,....., -8, 8,....., 15 | 4 |
| 5 | -31,....., -16, 16,....., 31 | 5 |
| 6 | -63,....., -32, 32,....., 63 | 6 |
| 7 | -127,....., -64, 64,....., 127 | 7 |
| 8 | -255,....., -128, 128,....., 255 | 8 |
| 9 | -511,....., -256, 256,....., 511 | 9 |
| 10 | -1023,....., -512, 512,....., 1023 | 10 |
| 11 | -2047,....., -1024, 1024,....., 2047 | 11 |
| 12 | -4095,....., -2048, 2048,....., 4095 | 12 |
| 13 | -8191,....., -4096, 4096,....., 8191 | 13 |
| 14 | -16383,....., -8192, 8192,....., 16383 | 14 |
| 15 | -32767,....., -16384, 16384,....., 32767 | 15 |

FIG. 22
(PRIOR ART)

GROUPING TABLE OF AC COEFFICIENTS

| GROUP NUMBER (S) | AC COEFFICNENT VALUE | ADDED BIT NUMBER (A) |
|---|---|---|
| 0 | 0 | 0 |
| 1 | -1, 1 | 1 |
| 2 | -3, -2, 2, 3 | 2 |
| 3 | -7,....., -4, 4,....., 7 | 3 |
| 4 | -15,....., -8, 8,....., 15 | 4 |
| 5 | -31,....., -16, 16,....., 31 | 5 |
| 6 | -63,....., -32, 32,....., 63 | 6 |
| 7 | -127,....., -64, 64,....., 127 | 7 |
| 8 | -255,....., -128, 128,....., 255 | 8 |
| 9 | -511,....., -256, 256,....., 511 | 9 |
| 10 | -1023,....., -512, 512,....., 1023 | 10 |
| 11 | -2047,....., -1024, 1024,....., 2047 | 11 |
| 12 | -4095,....., -2048, 2048,....., 4095 | 12 |
| 13 | -8191,....., -4096, 4096,....., 8191 | 13 |
| 14 | -16383,....., -8192, 8192,....., 16383 | 14 |
| 15 | -32767,....., -16384, 16384,....., 32767 | 15 |
| 16 | 32768 | 0 |

FIG. 25 (PRIOR ART)

CODING TABLE FOR DIFFERENCE DC COEFFICIENTS

| GROUP NUMBER(S) | CODING TABLE | CODE WORDS |
|---|---|---|
| 0 | 2 | 00 |
| 1 | 2 | 01 |
| 2 | 2 | 10 |
| 3 | 3 | 110 |
| 4 | 4 | 1110 |
| 5 | 5 | 11110 |
| 6 | 6 | 111110 |
| 7 | 7 | 1111110 |
| 8 | 8 | 11111110 |
| 9 | 9 | 111111110 |
| 10 | 10 | 1111111110 |
| 11 | 11 | 11111111110 |

FIG. 27
(PRIOR ART)

FIG. 28A (PRIOR ART) INPUT TO ENTROPY CODER 6 Ruv

FIG. 28B (PRIOR ART) OUTPUT FROM GROUPING PORTION 60

FIG. 28C (PRIOR ART) OUTPUT FROM HUFFMAN CODER 70

CODING TABLE OF AC COEFFICIENTS
FOR COLOR DIFFERENCE COMPONENTS

| RUN LENGTH /SSSS | CODE LENGTH | CODE WORDS |
|---|---|---|
| 0/0 (EOB*) | 2 | 00 |
| 0/1 | 2 | 01 |
| 0/2 | 3 | 100 |
| 0/3 | 4 | 1010 |
| ⋮ | ⋮ | ⋮ |
| 1/1 | 4 | 1011 |
| 1/2 | 6 | 111001 |
| 1/3 | 8 | 11110110 |
| ⋮ | ⋮ | ⋮ |
| 3/2 | 8 | 11111000 |
| ⋮ | ⋮ | ⋮ |
| 4/1 | 6 | 111010 |
| 4/2 | 9 | 111110110 |
| 4/3 | 16 | 1111111110010111 |
| 4/4 | 16 | 1111111110011000 |
| ⋮ | ⋮ | ⋮ |
| 4/A | 16 | 1111111110011110 |
| ⋮ | ⋮ | ⋮ |
| F/0 (ZRL*) | 10 | 1111111010 |
| ⋮ | ⋮ | ⋮ |
| F/A | 16 | 1111111111111110 |

FIG. 29
(PRIOR ART)

IMAGE CODING APPARATUS FOR COMPRESSING IMAGE DATA

BACKGROUND OF THE INVENTION

1. Field of the Invention

The present invention relates to an image coding control in an image coding apparatus for effectively processing a valid factor of a discrete cosine transform (DCT) coefficient after quantization. In particularly, the present invention relates to an image coding control for enabling a digital camera using a JPEG (Joint Photographic Expert Group) system to contain a fixed number of photographs in one disc.

2. Description of the Prior Art

In the past, Huffman coding has been used to reduce the volume of coding in a digital camera using the JPEG system. However, since Huffman coding has a variable length, the volume of coding varies depending on types of images. That is, a large compression ratio can be provided for a single color wall or sky, but cannot be provided for an image with a great variation. Therefore, the number of photographs which one disc can hold has varied depending on the images. Sometimes thirty photographs can be contained in one disc, and other times only five can be contained in one disc. In this kind of situation, it has been unknown how many discs were necessary when taking photographs, and in a situation such as a trip, many discs have had to have carried. The present invention provides an image coding apparatus for enabling discs to hold approximately the same number of photographs.

Before explaining the present invention, the conventional coding method is explained below. FIG. 18 shows a conventional image coding apparatus. The image coding apparatus of FIG. 18 comprises an input terminal 1 for inputting image data of 8×8 pixels, a discrete cosine transformer (DCT) 2, a zigzag converter 3, a quantizer 4, a quantizing table 5, an entropy coder 6, a coding table 7, and an output terminal for outputting a parameter or coding data.

The operation of the conventional coding method is explained below. First of all, image data, for example, a component image Pxy (x, y=0, 1, 2, 3, . . . , 7), is input from the data inputting terminal 1. The image data input is transmitted to the discrete cosine transformer 2. The discrete cosine transformer 2 performs a two dimensional discrete cosine transformation. As a result of the two dimensional discrete cosine transformation, 64(=8×8) coefficients Suv are obtained. The 64 coefficients are rearranged from a serial order to a zigzag order and transmitted to the quantizer 4. The quantizer 4 quantizes the 64 coefficients for each step size, which differs for every coefficient position, using the table 5. The 64 quantized coefficients are transmitted to the entropy coder 6. The entropy coder 6 performs Huffman coding using the coding table 7, and the coding data is output from the output terminal 8 in several byte units (for example, a 16-bit width).

The 8×8 pixel component image Pxy (x, y=0, 1, 2, 3, . . . , 7) is processed with a two dimensional DCT, and the coefficient Suv is obtained as the following formula (1):

$$S_{u,v} = \frac{1}{4} C_u C_v \sum_{x=0}^{7} \sum_{y=0}^{7} (P_{xy} - L_s) \cos\frac{(2x+1)u\pi}{16} \cos\frac{(2y+1)v\pi}{16}. \quad (1)$$

Where, x, y = positions of pixels within a block
u, v = positions of the DCT coefficients $Cu, Cv = \frac{1}{\sqrt{2}} \quad : u, v = 0$ $\quad\quad\quad = i \quad : \text{the others}$ $Ls = 128 \quad : \text{bit precision of } Pxy = 8 \text{ bits}$
$\quad = 2048 : \quad\quad\quad\quad\quad\quad = 12 \text{ bits}$ The DCT coefficients Suv include $S_{00}$ (DC (direct current)) components and other $S_{01}$–$S_{77}$ (AC (alternating current)) components. $S_{00}$ is the largest, and the AC components are extremely small compared with $S_{00}$.

Secondly, the zigzag converter 3 converts the DCT coefficient Suv from a serial order to a zigzag order. Then the DCT coefficients Suv are input to the quantizer 4. The quantizer 4 divides the DCT coefficients using the value Quv of the quantizing table 5. That is, the quantized DCT coefficients Ruv are obtained in the following formula.

$Ruv = \text{round } (Suv/Quv)$ where, the round function converts the result of Suv/Quv to the closest integer. Therefore, by determining that the value Quv in the quantizing value table 5 is large compared to the AC coefficient, it is possible to make almost all the coefficients zero in the AC area.

Then, the 64 coefficients Ruv output from the quantizer 4 are transmitted to the entropy coder 6. Since the coding systems are different for a DC coefficient ($R_{00}$) showing the average value of 8×8 pixels and for the other AC coefficients (all except for $R_{00}$), the coding systems are explained separately.

First of all, a block diagram for grouping of the DC coefficients $R_{00}$ is illustrated in FIG. 20. In FIG. 20, a block delaying portion 61 delays the preceding DC coefficient $R_{00}$, and a subtractor 62 subtracts the delayed DC coefficient $R_{00}$ from the preceding $R_{00}$. The difference is transmitted to the grouping portion 63. In the operation of the subtractor 62, as shown in FIG. 21, the difference between the DC coefficient (DC i) of the current DC component block (i) and the DC coefficient ($DC_{i-1}$) of the same colored component block (i−1) which is preceedingly coded is calculated, and the resultant difference ($\Delta DC\ i$) is obtained. Except for special images, such as computer graphics, it is rare that the average value changes greatly between one block and an adjacent block. Therefore, the difference between a DC coefficient and the preceding DC coefficient centers around zero. Therefore, it is possible to expect better coding by coding the difference obtained in this manner.

The difference of the DC coefficient obtained by the above subtractor 62 is input to the grouping portion 63, and the group to which the difference value belongs is obtained using the table shown in FIG. 22. The output from the grouping portion 63 represents the group number (S) of the DC difference value and the added bit (A), where, the added bit (A) is a number indicating the order of the difference value within the group. For example, in the group 3 of FIG. 22, the added bit number is 3, and the DC difference value may take eight values such as −7, −6, −5, −4, 4, 5, 6, 7. Therefore, the added bit of 000 is assigned to −7, 001 for −6, 010 for −5, 011 for −4, 100 for 4, 101 for 5, 110 for 6 and 111 for 7. In this manner, the group number (S) and the added bit (A) are output from the grouping portion 63. The group number (S) and the added bit (A) are one dimensional Huffman coded by an one dimensional Huffman coder 65 shown in FIG. 26, as explained below.

FIG. 23 shows a block diagram for grouping the AC coefficients in the image coding apparatus. Since the AC coefficients are already rearranged by the zigzag converter such as shown in FIG. 24, they are output in the order of the zigzag sequence. When the judgment portion 92 determines that each AC coefficient is 0, the run length counter 93 counts the continuous number of the AC coefficients that are 0, and outputs the number as a run length (N).

When the AC coefficient is other than 0, the group number (S) and the added bit (A) are generated in the grouping portion 94 in the same method as that of when the DC difference is obtained. The group in which the AC coefficient belongs is obtained using the table shown in FIG. 25 where, the added bit is the value which represents the order of the AC coefficients within the group. For example, assuming that AC coefficient is 7, its group number is 3. In group 3, the added bit number is 3, and the DC difference value may take the eight values −7, −6, −5, −4, 4, 5, 6, 7. Therefore, the added bit of 000 is assigned to −7, 001 for −6, 010 for −5, 011 for −4, 100 for 4, 101 for 5, 110 for 6 and 111 for 7. In this manner, the grouping number (S) and the added bit (A) is output from the grouping portion 94.

The group number (S) output from the grouping portion 94 and the run length (N) output from the run length counter 93 are Huffman coded by a two dimensional Huffman coder part 95 of a Huffman coder 70 and an AC coding table 96 as explained below.

FIG. 26 shows a circuit diagram for grouping and Huffman coding of the DC coefficients and the AC coefficients. In FIG. 26, a DC grouping portion 60a is the same circuit as that shown in FIG. 20, and an AC grouping portion 60b is the same circuit as that shown in FIG. 23.

The Huffman coder 70 is explained below. In FIG. 26, the Huffman coder 70 comprises an one dimensional Huffman coding part 65, a DC coding table 66, a DC added bit coupling portion 67 for coding the DC coefficient, a two dimensional Huffman coding part 95, an AC coding table 96 and an AC added bit coupling portion 97 for coding the AC coefficient. A coupling portion 68 couples the DC coding signal and the AC coding signal.

Firstly, the coding of the DC coefficient is discussed below. The group number S obtained from the DC grouping portion 60a is one dimensional Huffman coded in the one dimensional Huffman coding part 65 using the DC coding table in the DC coding table 66, and output as a DC code.

One example of the one dimensional Huffman coding is shown in FIG. 27. For example, when the group number 3 is input into the one dimensional Huffman coding part 65, the one dimensional Huffman coding part 65 outputs the number 110 as a one dimensional Huffman coded DC code. The number 110 output from the one dimensional Huffman coding part 65 is coupled with the added bit 100 (4) output from the grouping portion 60a in the DC added bit coupling portion 67, and the result is 110100 (DC code+added bit).

Next, the coding of the AC coefficients is explained below. In FIG. 26, the group number S output from the grouping portion 60b and the run length N output from the run length counter 93 in the grouping portion 60b are Huffman coded by two dimensional Huffman coding part 95 using the AC coding table 96. The added bit A is added to the coded value in the AC added bit coupling portion 97, and output as the AC code. The two dimensional Huffman coding is explained below using a concrete example.

FIGS. 28A, 28B, and 28C show an example of coding the signal Ruv. The signal Ruv is input to the entropy coder 6 in FIG. 26. The signal Ruv comprises one DC coefficient $R_{00}$, one AC coefficient AC1 (value=3), four invalid coefficients of value "0", one AC coefficient AC2 (value=10), and 57 invalid coefficients of value "0".

According to the above example, the first AC coefficient AC1 includes one zero invalid coefficient (Run Length=0) and one AC coefficient having value of 3 as shown in FIG. 28A. The zero invalid coefficient having value of 0 is input to the two dimensional Huffman coding part 95 as a run length (N=0). The following value "3" is also input to the two dimensional Huffman coding part 95. Since the value of the AC coefficient is 3, the group number S becomes 2 according to FIG. 25. Since the value 3 of the valid coefficient is the largest in the group, the added bit becomes 11. Therefore, in the two dimensional Huffman coder, the invalid coefficient (N) is 0, and the group number (S) is 2, as stated above. Therefore N/S becomes 0/2 as shown in FIG. 28B. Therefore, in the two dimensional Huffman coding part 95, the two dimensional Huffman coding is performed according to the AC coding table 96 (FIG. 29) corresponding to N/S (0/2), and then the added bit is added to the result, and the two dimensional Huffman coding signal "10011" is obtained as shown in FIG. 28C.

On the other hand, the next portion includes four invalid coefficients having value of 0 (Run length=4) and one AC coefficient AC2 (value=10) as shown in FIG. 28A. This portion produces the group number (S) of 4 and the added bit of 1010 (10). Therefore, the AC grouping portion 60b causes the N/S signal of 4/4 to be supplied to the two dimensional Huffman coding part 95 as shown in FIG. 28B. Then the two dimensional Huffman coding part 95 carries out the two dimensional Huffman coding using the AC coding table 96 (FIG. 29). Then the added bit is added to the result from the two dimensional Huffman coding part 95 at the AC added bit coupling portion 97 to obtain the two dimensional Huffman coding signal "111111111100110001010" as shown in FIG. 28C. For the remaining 57 invalid coefficients, the two dimensional Huffman coding part 95 produces the EOB (End of Block) code "00" which is added to the result of the preceding signals as shown in FIG. 28C. Then, the coding process is completed.

Therefore, as stated above, the Huffman coding system is a variable length coding system where the code length changes according to incoming data, and the volume of coding changes according to the original image.

Since the conventional image coding apparatus is constructed in the manner explained above, there has been a problem that the compression ratio varies depending on the image, and the coding volume (compressed data volume) also differs even if the image is the same.

SUMMARY OF THE INVENTION

It is an object of the present invention to provide an image coding apparatus for cutting off some data for images with a large volume of coding to keep the data for a number of images below a predetermined volume.

According to one aspect of the invention, an image coding apparatus for compressing image data comprises a data processing means for counting the number of the quantized AC coefficients equal to not zero, for outputting the portions of the quantized AC coefficients that are not zero without change, or for forcibly replacing the quantized AC coefficients with zero, based on the counted value, and outputting the result, whereby the quantity of the quantized AC coefficients that are not zero and that are to be transmitted is reduced.

According to another aspect of the invention, an image coding apparatus wherein the data processing means comprises a zero detecting circuit for determining whether the quantized AC coefficients are zero; a counter, which is reset periodically, for counting the quantized AC coefficients that are not zero; a comparator for comparing a count of the counter and a first reference value, and outputting an AC coefficient eliminating signal when the count exceeds the first reference value; and a first logic circuit for replacing the quantized AC coefficients with zero based on the AC coefficient eliminating signal whereby the data quantity of the quantized AC coefficients that are not zero to be transmitted is reduced.

According to a further aspect of the invention, the data processing means in the image coding apparatus further comprises, a second counter, that is reset periodically, for counting the clock signal; a second comparator for comparing a count of the second counter and a third reference value and for outputting an AC coefficient hold signal when the count of the second counter exceeds the third reference value; and a second logic circuit for preventing the AC coefficient eliminating signal received from the first comparator from passing when the second comparator outputs the AC coefficient hold signal wherein said first logic circuit forcibly replaces the quantized AC coefficients with zero only when the AC coefficient hold signal is not output and when the AC coefficient eliminating signal is output, and the AC coefficients are not eliminated when the AC coefficient hold signal is output.

According to a still further aspect of the invention, the data processing means in the image coding apparatus comprises, a zero detecting circuit for determining whether the quantized AC coefficients are zero or not; a counter, which is reset periodically, for counting the quantized AC coefficients that are not zero as a count; a first register for temporarily storing the count; a subtractor for subtracting the count of the counter from the value of the first register; a second register for temporarily storing the result of subtracting; an adder for adding the value of the second register to a fourth reference value and for sending the sum to the first register; a large-small discriminating circuit for outputting an AC coefficient eliminating signal when the result of the subtracting is negative; and a first logic circuit for forcibly replacing the quantized AC coefficients with zero based on the AC coefficient eliminating signal from the large-small discriminating circuit.

According to a further aspect of the invention, the data processing means in the image coding apparatus further comprises, a second counter, that is reset periodically, for counting the clock signal; a comparator for comparing the count of the second counter and a third reference value and for outputting an AC coefficient hold signal when the count of the second counter exceeds the third reference value; and a second logic circuit for preventing the AC coefficient eliminating signal received from the large-small discriminating circuit from passing through when the second comparator outputs a hold signal wherein said first logic circuit forcibly replaces the quantized AC coefficients with zero only when the AC coefficient hold signal is not output and the AC coefficient eliminating signal is output, and the AC coefficients are not eliminated when said AC coefficient hold signal is output.

According to a further aspect of the invention, the data processing means in the image coding apparatus further comprises, an MCU counter for supplying a reset signal to the counter.

BRIEF DESCRIPTION OF THE DRAWINGS

FIGS. 3A~3F are timing charts explaining the operation of the data processing circuit of FIG. 2.

FIGS. 5A~5G are timing charts explaining the operation of the data processing circuit of FIG. 4.

FIGS. 7A~7I are timing charts explaining the operation of the data processing circuit of FIG. 6.

FIGS. 15A~15I are timing charts explaining the operation of the data processing circuit of FIG. 14.

FIGS. 17A~17J are timing charts explaining the operation of the data processing circuit of FIG. 16.

FIG. 22 shows a grouping table for grouping the difference values of the DC coefficient in the image coding apparatus of FIG. 18.

FIG. 25 shows a grouping table for grouping the AC coefficients in the image coding apparatus.

FIG. 27 is a coding table for coding the difference of the DC coefficients in the image coding device of FIG. 18.

FIG. 29 is a coding table of AC coefficients for color difference components.

DETAILED DESCRIPTION OF THE PREFERRED EMBODIMENTS

Embodiment 1

Figure 1:
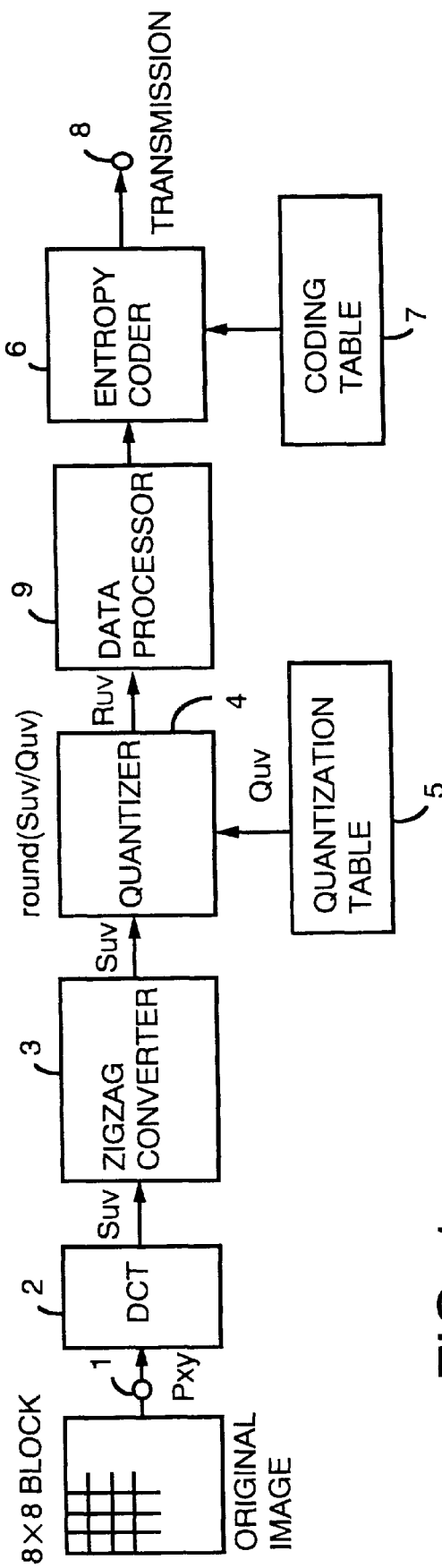
FIG. 1 shows an image coding apparatus according to the present invention.

FIG. 1 shows an image coding apparatus according to the present invention. The image coding apparatus of FIG. 1 comprises an input terminal 1 for receiving image data of 8×8 pixels, a discrete cosine transformer 2, a zigzag converter 3, a quantizer 4, a quantizing table 5, an entropy coder 6, a coding table 7, an output terminal 8 for outputting a parameter or coding data, and a data processor 9 for processing the DCT coefficients after quantization.

Figure 2:
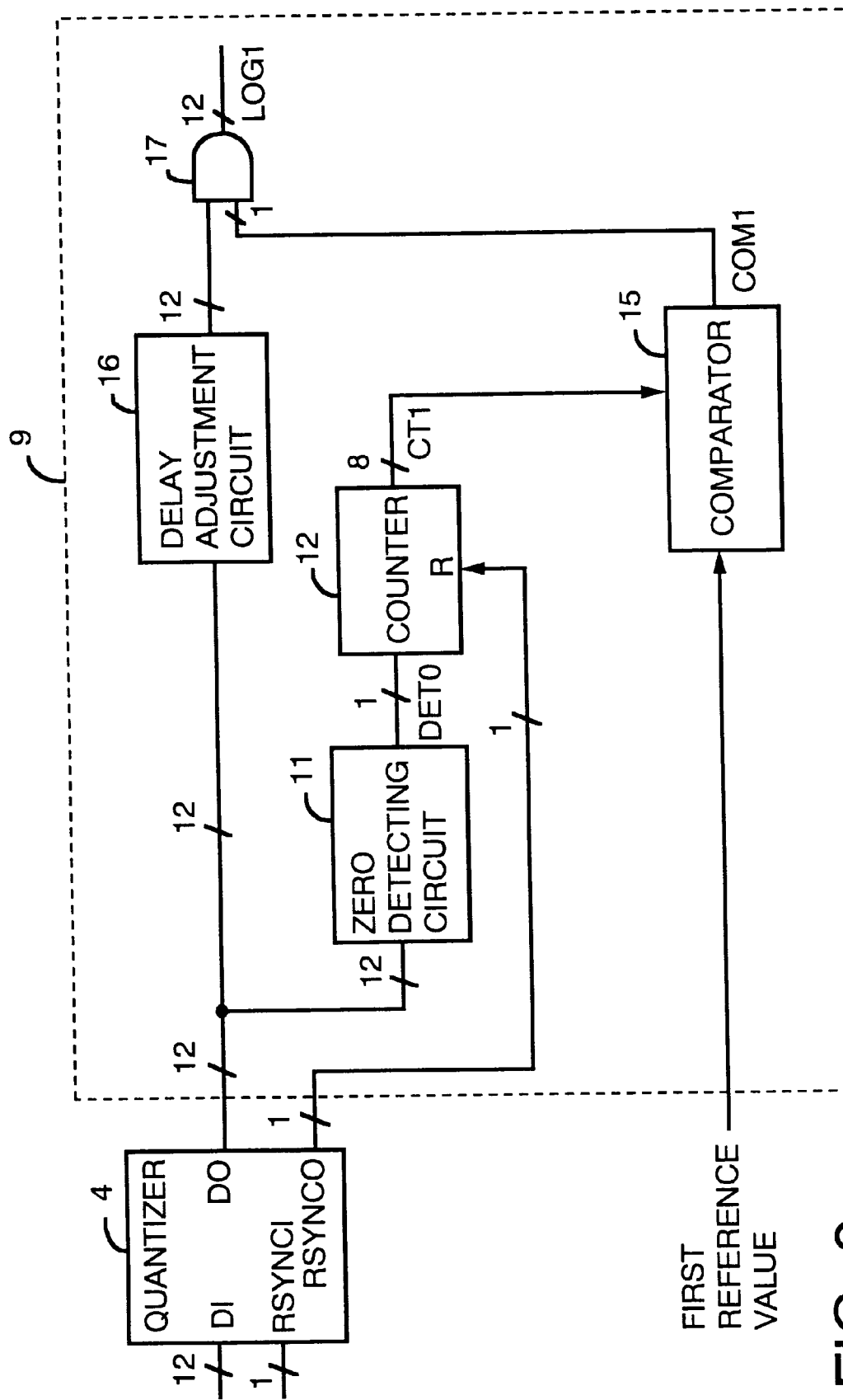
FIG. 2 shows a circuit of a data processing portion for counting the DCT coefficient values other than 0 after quantization and for effectively controlling the code volume according to a first embodiment of the present invention.

FIG. 2 shows the data processor 9 according to a first embodiment of the present invention for counting the DCT coefficients other than zero after quantization by the quantizer 4 and for effectively controlling the volume of coding. The data processor 9 of FIG. 2 comprises a zero detecting circuit 11, a counter 12, a comparator 15, a delay adjustment circuit 16 and a logic circuit 17.

The operation of the image coding apparatus of the present invention is explained below using FIG. 1 and FIG. 2. First of all, the discrete cosine transformer 2 carries out the two dimensional discrete cosine transformation for every image component comprising 8×8 pixels, and, as a result, 64 DCT coefficients Suv are obtained. The 64 DCT coefficients Suv are transmitted to the zigzag converter 3, and rearranged from a serial order to a zigzag order. The 64 DCT coefficients Suv rearranged in the zigzag order are input to the quantizer 4. The quantizer 4 divides the DCT coefficients Suv by the value Quv of the quantizing table 5. The first of the 64 coefficients Ruv which are rearranged in the zigzag order and quantized, becomes a DC (direct current) coefficient, and the second to the sixty-fourth coefficients become AC (alternating current) coefficients. The quantizer 4 outputs an RSYNCO (synchronous out) signal synchronized with the output of the DC coefficients. The zero detecting circuit 11 determines if the AC (alternating current) coefficients in the coefficients Ruv output from the quantizer 4 are zero. When the AC coefficients are not zero, the zero detecting circuit 11 outputs a detecting signal DET0. Zero means that the bits comprising the AC coefficients are all zero. The counter 12 counts the number of AC coefficients which are not zero within the coefficients Ruv for every block (for example, 8×8=64 pixels ). The initial value of the output value of the counter 12 is zero. The comparator 15 compares the count value of the counter 12 and a first reference value. When the count value of the counter 12 exceeds the first reference value, the comparator 15 outputs a logic "L". If the count value of the counter 12 is equal to or smaller than the first reference value, the comparator 15 outputs a logic "H". The delay adjustment circuit 16 temporarily stores the DCT coefficients Ruv for the purpose of delay adjustment. The logic circuit 17 either outputs the value from the delay adjustment circuit 16 without change or forcibly converts the value from the delay adjustment circuit 16 to zero and outputs it to the entropy coder 6, depending on the output of the comparator 15. The output data group is transmitted to the entropy coder 6 as required, and the entropy coder 6 the Huffman codes the data group.

FIGS. 3A~3F are timing charts explaining operation of the data processing circuit of FIG. 2. FIG. 3A shows a clock signal used in the data processor 9, FIG. 3B shows the RSYNCO signal output from the quantizer 4, FIG. 3C shows the stream of the DCT coefficients Ruv output from the quantizer 4, FIG. 3D shows the output value of the counter 12, FIG. 3E shows the output value of the comparator 15, and FIG. 3F shows the DCT coefficients Ruv output from the logic circuit 17.

Figure 19:
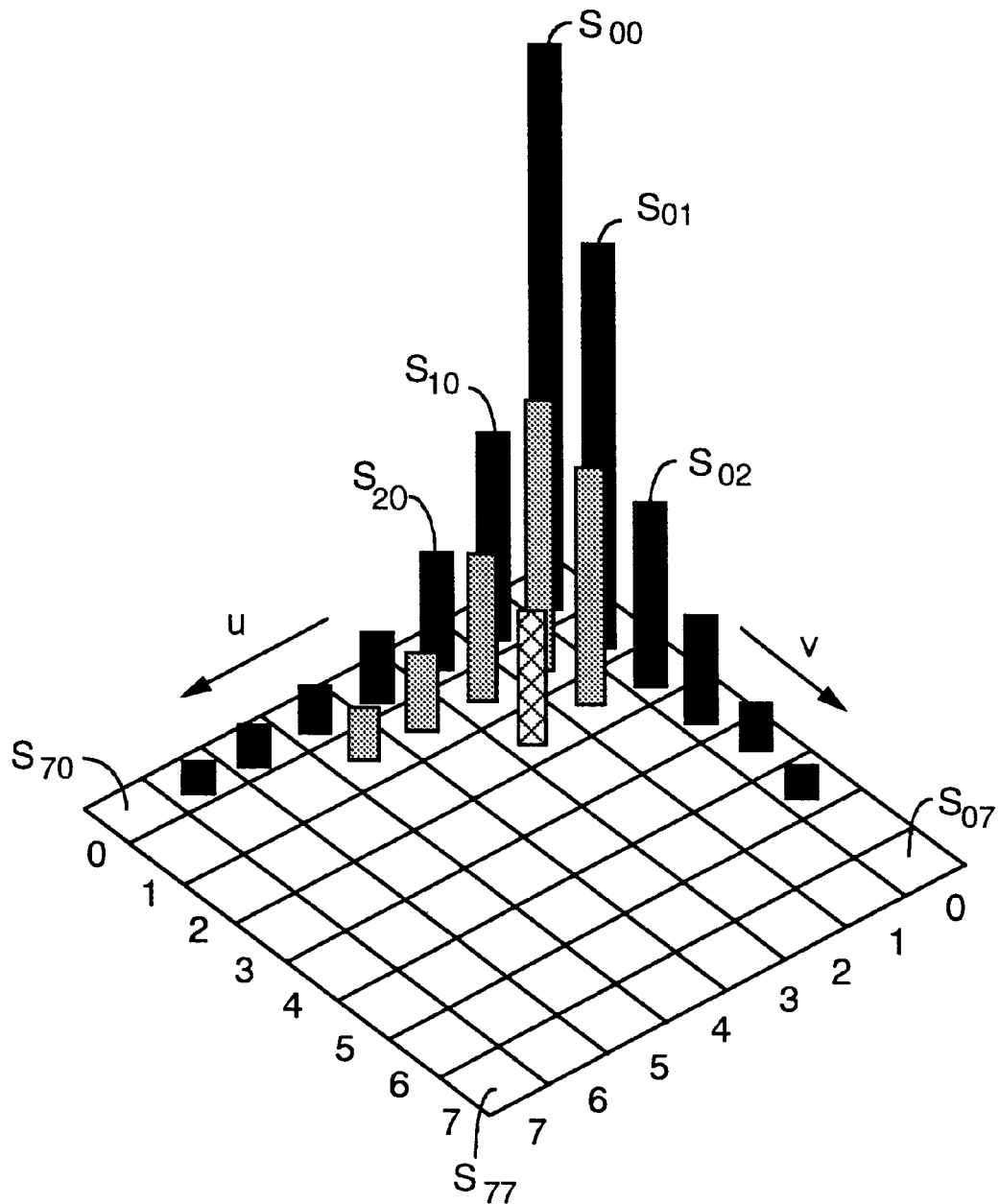
FIG. 19 shows a distribution graph of a quantized DCT coefficient after quantization and two dimensional discrete cosine transformation of 8×8 pixels in the image coding apparatus of FIG. 18.
Figure 20:
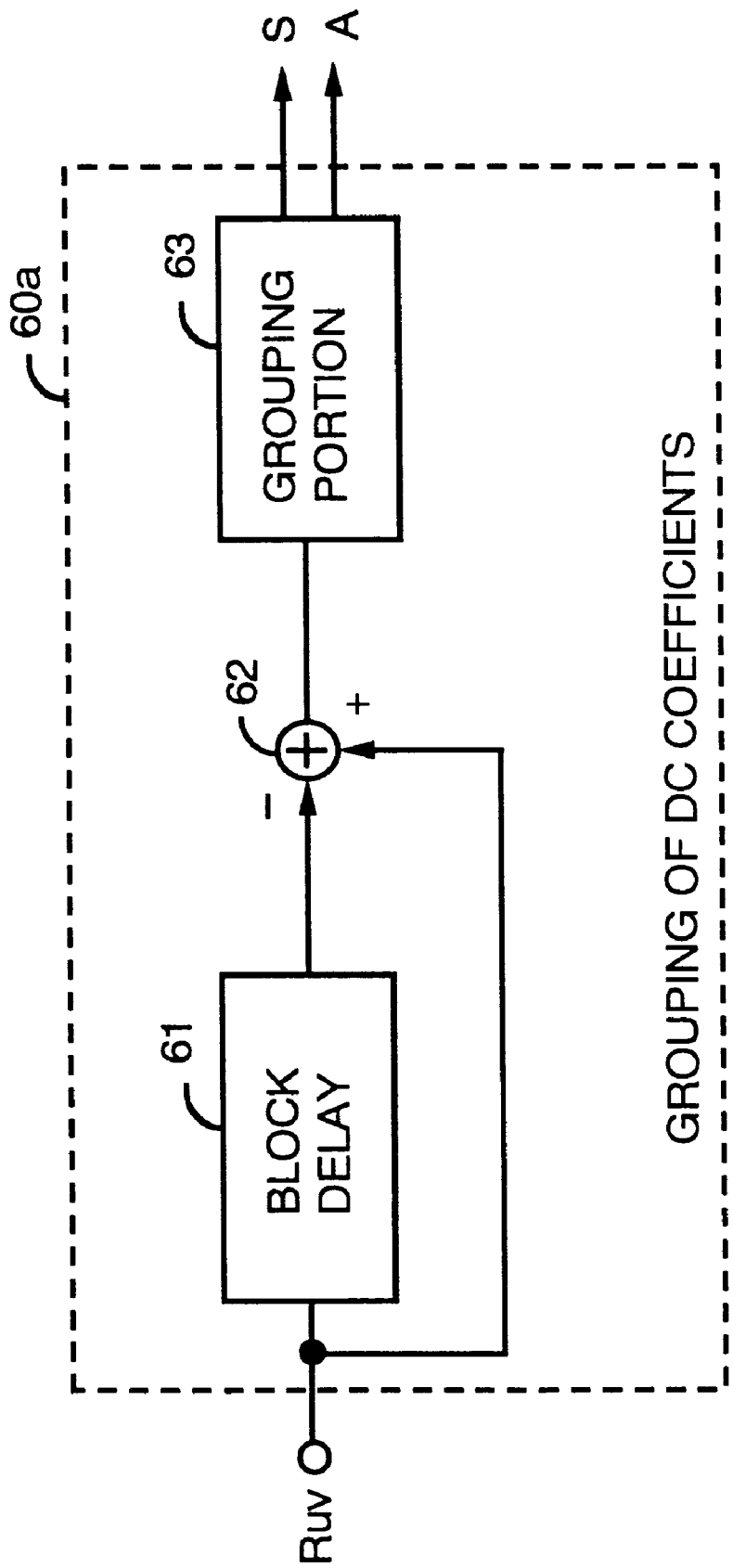
FIG. 20 shows the grouping circuit of the DC coefficient in the image coding apparatus.
Figure 21:
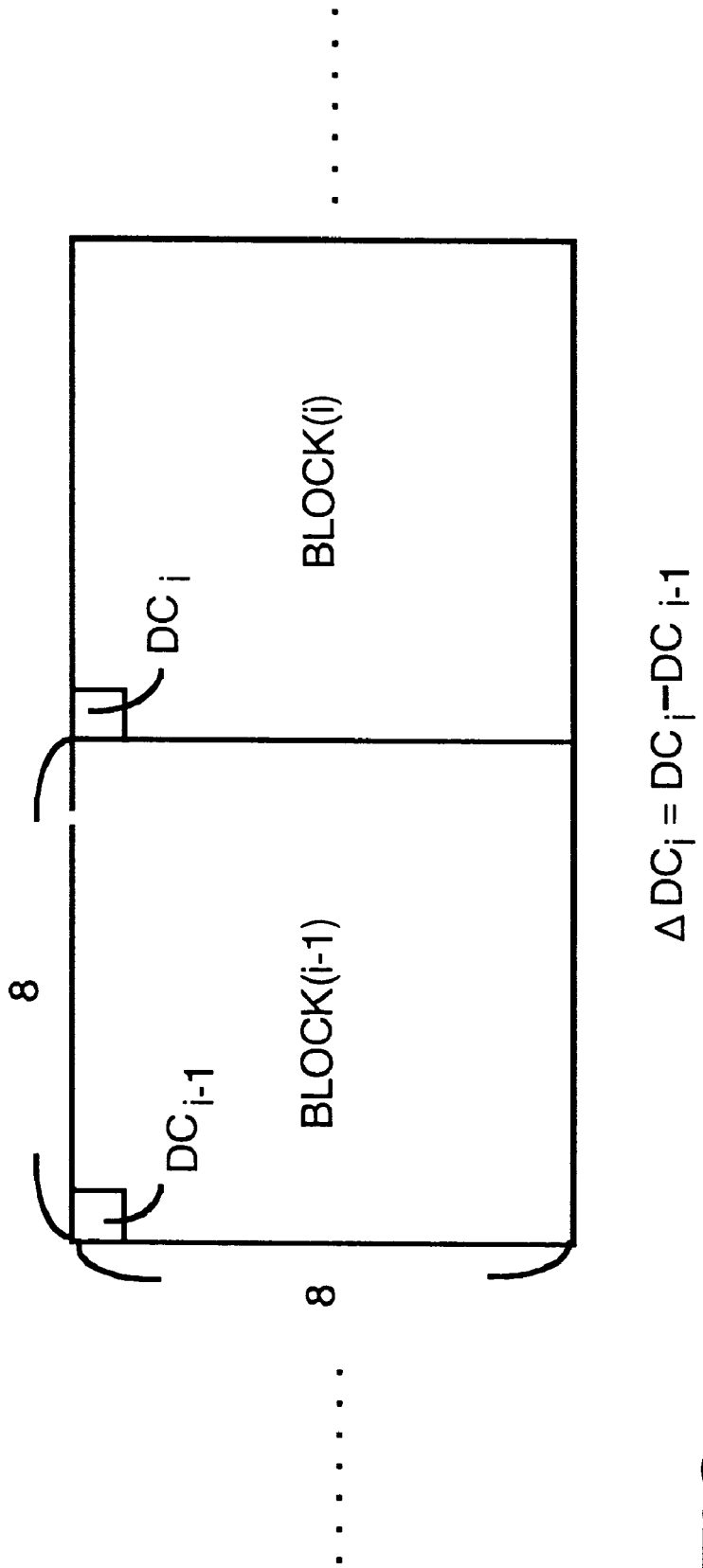
FIG. 21 shows the concept of the subtracting process of the DC coefficient in the image coding device.
Figure 23:
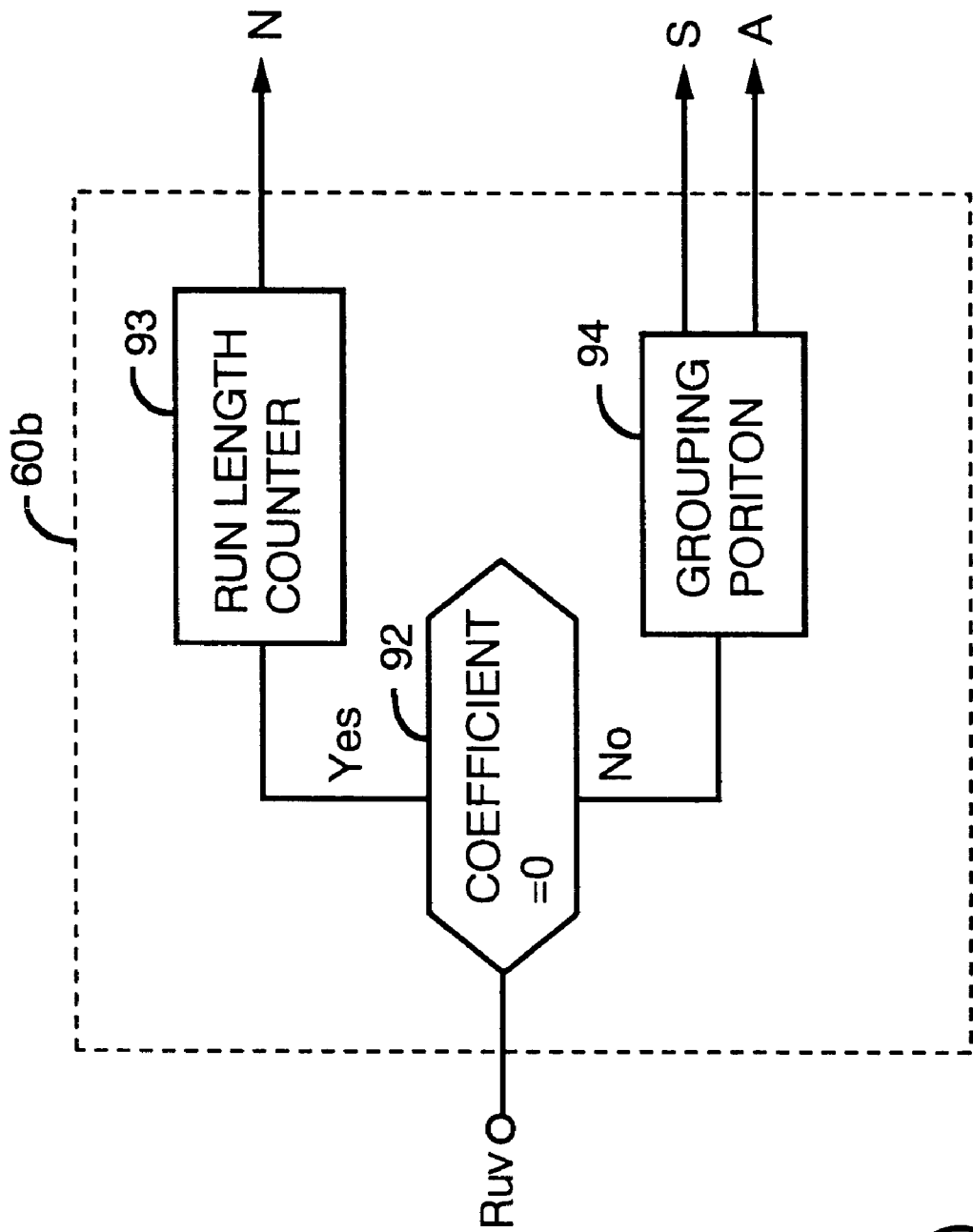
FIG. 23 shows a grouping circuit of the AC coefficient in the image coding apparatus of FIG. 18.
Figure 24:
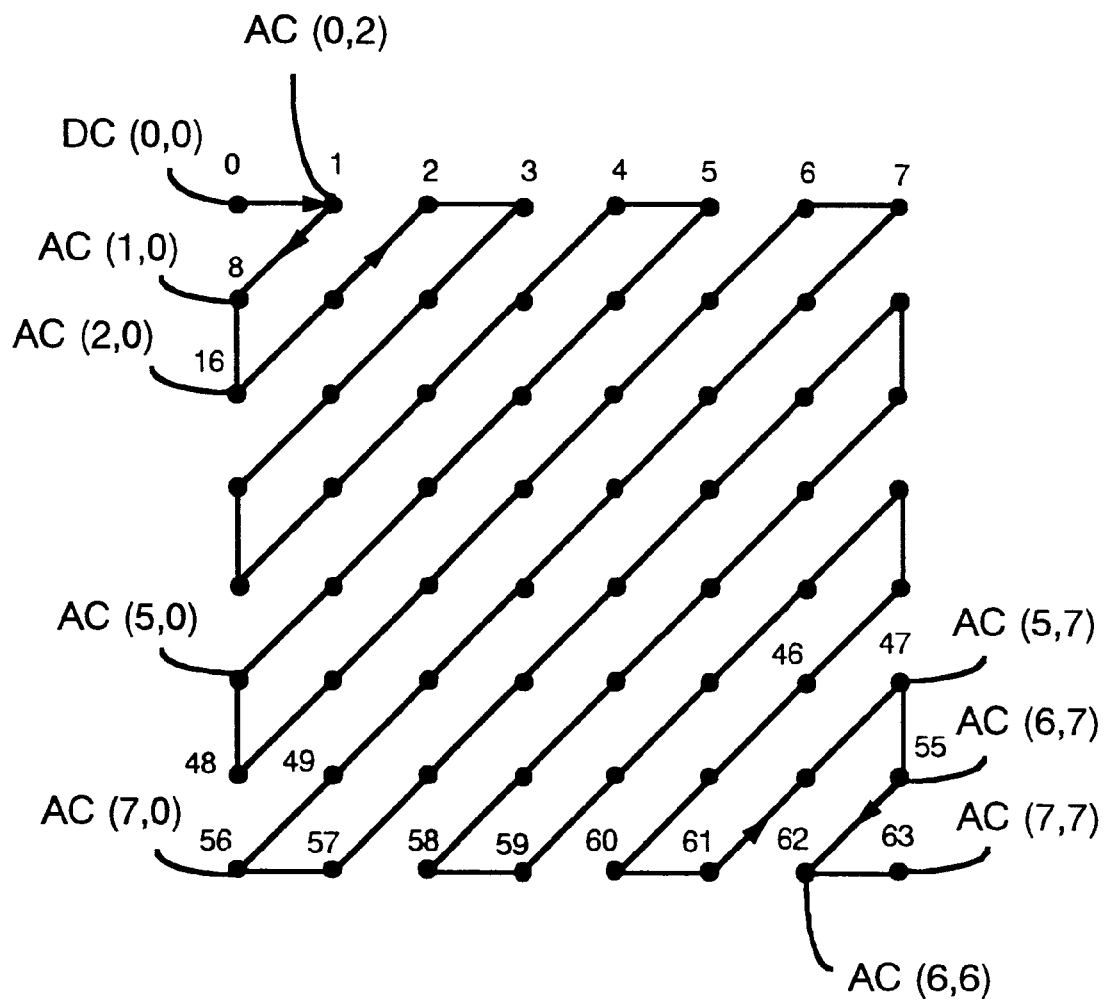
FIG. 24 shows a zigzag scanning order of the 8×8 pixels in the image coding apparatus of FIG. 18.
Figure 26:
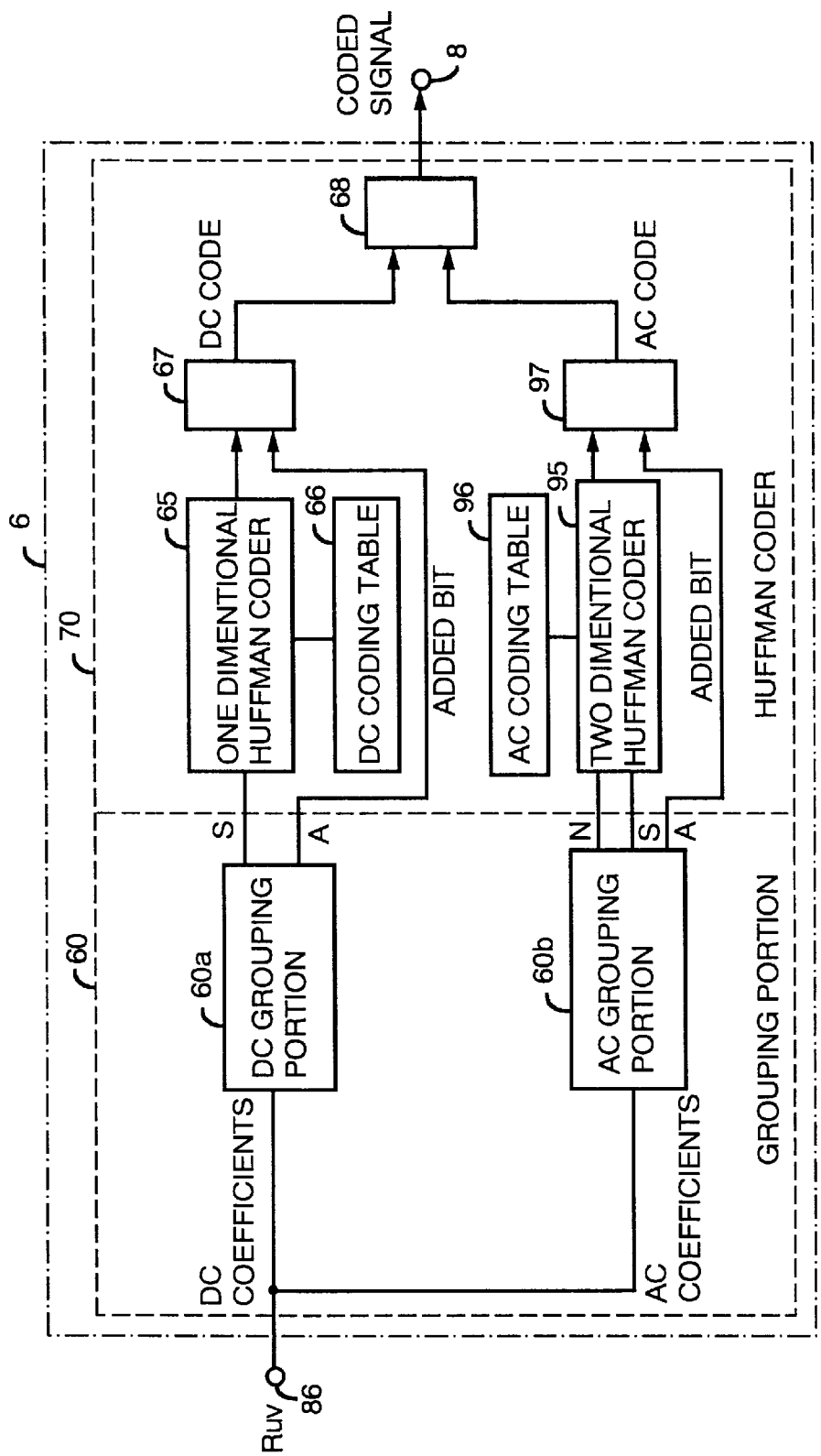
FIG. 26 illustrates Huffman coding of the DC coefficients and the AC coefficients in the image coding device of FIG. 18.
Figure 28:
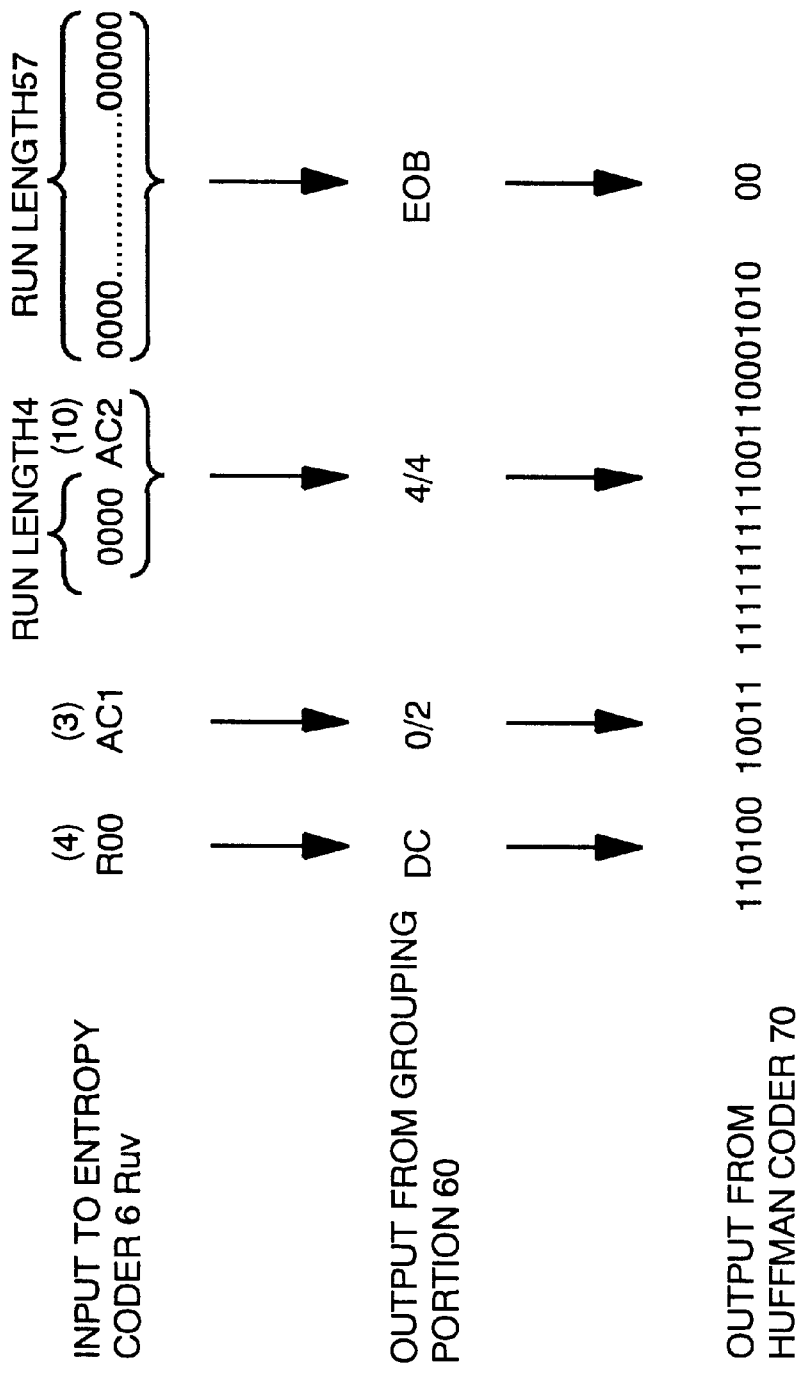
FIGS. 28A~28C show the order in which the AC coefficients and the DC coefficients are grouped in the image coding device of FIG. 18.

The RSYNCO signal is a pulse output in synchronization with the DC coefficient of the DCT coefficients Suv, and is used for resetting the counter 12 in the data processor 9. A DO signal output comprises one DC coefficient and the succeeding 63 AC coefficients in the zigzag order. As explained for FIG. 19, the AC coefficients other than zeros are transmitted at the beginning, but the latter portions of the AC coefficients tend to consist of more zeros. The present invention utilizes this feature, that is, in the DCT coefficients in the zigzag order, the latter portion of the DCT coefficients contains more zero DCT coefficients. The present invention reduces the transmitted data volume by replacing the AC coefficients by zeros in the latter portions of the DCT coefficients.

In order to simplify the explanation, it is assumed here that the output signal DO from the quantizer 4 is arranged in the order of DC, *, *, 0, 0, *, 0, . . . 0,* . . . * 0, 0, DC, *, *, *,0, . . . as shown in FIG. 3C. "DC"s indicate the DC coefficients, the "*" marks indicate AC coefficients which are not zeros and "0"s indicate AC coefficients which are zeros. The zero detecting circuit 11 detects the AC coefficients which are not zeros and outputs the detected number as DET0 to the counter 12. This DET0 is a pulse output when "*" mark is detected, but it is not shown in FIGS. 3A~3F. When the counter 12 receives the DET0 pulse from the zero detecting circuit 11, the counter 12 increments the count value, and accumulates the value CT1 as shown in FIG. 3D. The RSYNCO signal output in synchronization with the DC coefficients resets the counter 12 for every 8×8=64 pixels. The comparator 15 compares the first reference value (in the present embodiment, for example, 2 in digital value) with the count of the counter 12. When the count of the counter 12 exceeds the first reference value, the comparator 15 outputs the COM 1 (logic "L") as shown in FIG. 3E. In the present embodiment, for example, since the logic circuit 17 is an AND circuit, when the output of the comparator 15 changes to the logic "L", the output of the logic circuit 17 changes to "0". This logic circuit may also be constructed by switches. For example, by grounding the output of the logic circuit 17 when the logic "L" is output from the comparator 15 and connecting the input of the logic circuit to the delay adjustment circuit 16 when the logic "H" is output from the comparator 15, it is also possible to achieve the same operation as that of the AND circuit.

On the contrary, when the output from the comparator 15 is "H", that is, when the count of the counter 12 does not exceed the first reference value, the output signal DO from the quantizer 4 passes through without change. The delay adjustment circuit 16 is a circuit for phase adjustment between the output signal from the comparator 15 and DO from the quantizer 4. FIG. 3F illustrates the DCT coefficients (LOG1) output from the logic circuit 17. FIG. 3F shows that, during the time when the output from the comparator 15 is logic "L", the outputs of the logic circuit 17 are replaced by "0".

As explained above, when the output of the comparator 15 is the logic "L", the DO signal output from the quantizer 4 is "0". Therefore, it is possible to reduce the volume of data supplied to the entropy coder 6 of the succeeding stage.

Embodiment 2

Figure 4:
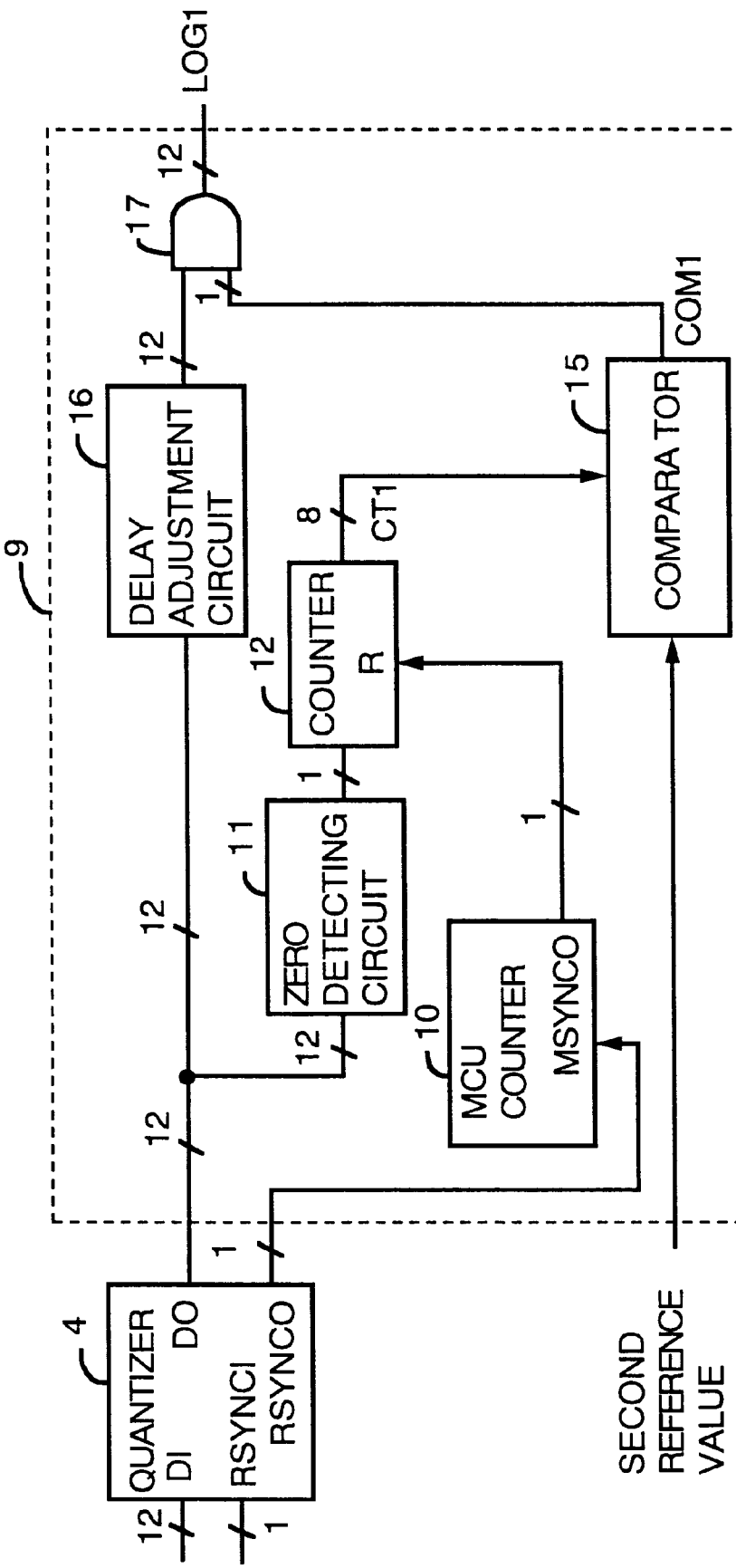
FIG. 4 shows the circuit of a data processing portion for counting the DCT coefficient values other than 0 after quantization and for effectively controlling the code volume according to a second embodiment of the present invention.

FIG. 4 shows a data processor 9 in an image coding apparatus according to a second embodiment of the present invention. The data processor 9 counts the number of the AC coefficients other than zeros within the DCT coefficients after the quantization performed by the quantizer 4, and effectively controls the volume of coding. The data processor 9 of FIG. 4 comprises an MCU (Minimum Coded Unit) counter 10, a zero detector 11, a counter 12, a comparator 15, a delay adjustment circuit 16, and a logic circuit 17.

The operation of the image coding apparatus of the present invention is explained below using FIG. 1 and FIG. 4. First of all, the discrete cosine transformer 2 carries out the two dimensional discrete cosine transformation for every component image comprising 8×8 pixels, and, as a result, 64 DCT coefficients Suv are obtained. The 64 DCT coefficients Suv are transmitted to the zigzag converter 3, and rearranged from a serial order to a zigzag order. The 64 DCT coefficients Suv rearranged in the zigzag order are input to the quantizer 4. The quantizer 4 divides the DCT coefficients Suv by the value Quv of the quantizing table 5. The first of the 64 coefficients, Ruv, which are rearranged in the zigzag order and quantized, is a DC (direct current) coefficient, and the second to the sixty-fourth coefficients are AC (alternating current) coefficients. The quantizer 4 outputs an RSYNCO (synchronous out) signal synchronized with the output of the DC coefficients. The MCU counter 10 counts the number of the blocks (for example, 8×8 pixels), and outputs an MSYNCO signal for every of the MCU, which is a basic unit of the process. Examples of the MCUs (Minimum Coded Units) are YUV, YYUV and YYYYUV.

Where, Y represents a intensity signal and an UV represents a color difference signal. The second embodiment, in which these MCUs are used, is used in a situation where, for example, the intensity Y is more significant than the color difference signal UV. In other words, the second embodiment is applied where the intensity signal Y needs to be transmitted without change as far as much as possible, and where the AC components of the color difference signal UV can be replaced by zero, since human eyes are characterized by sensitivity to the intensity signal.

In FIG. 4, the zero detecting circuit 11 determines if the DCT coefficients Ruv output from the quantizer 4 are zero, and outputs a detecting signal DET0 if the Ruv are not zero. The counter 12 counts the number of the AC coefficients in the coefficients, Ruv, which are not zero, for every MCU. The comparator 15 compares the number of non-zero AC coefficients which are counted and accumulated in the counter 12, with a second reference value (for example, a digital value 8 here). If the count value of the counter 12 exceeds the second reference value, the comparator 15 outputs the logic signal "L", and if the count value of the counter 12 is equal to or smaller than the second reference value, the comparator 15 outputs the logic signal "H". The delay adjustment circuit 16 temporarily stores the DCT coefficients Ruv for the purpose of delay adjustment. The logic circuit 17 either outputs the value of the delay adjustment circuit 16 without change or forcibly converts the value from delay adjustment to zero and outputs it, depending on the output of the comparator 15. The output data group is transmitted to the entropy coder 6 as required, and the entropy coder 6 Huffman codes the data group.

FIGS. 5A~5G are timing charts explaining operations of the data processing circuit of FIG. 4. FIG. 5A shows a clock signal used in the data processor 9, FIG. 5B shows the RSYNCO signal output from the quantizer 4, FIG. 5C shows the MSYNCO signal output from the counter 10, FIG. 5D shows the stream DO of the DCT coefficients Ruv output from the quantizer 4, FIG. 5E shows the output value (COM1) of the comparator 15, and FIG. 5F shows the DCT coefficients Ruv (LOG1) output from the logic circuit 7.

The RSYNCO signal is a pulse output in synchronization with the DC coefficient of the DCT coefficients Suv. The MCU counter 10 counts the RSYNCO signal. For example, since FIG. 5D assumes that the unit of the MCU is YUV, the count of the RSYNCO signals in the MCU counter 10 corresponds to the number of YUV, that is, 3. Therefore, the reset pulse MSYNCO signal is generated for every 64 pixels×3 as shown in FIG. 5C. If it is assumed that the unit of the MCU is YYYYUV, the count of the MCU counter 10 is 6. In this case, the reset pulse MSYNCO signal is generated for every 64 pixels×6.

A DO signal output comprises one DC coefficient and the succeeding 63 AC coefficients in the zigzag order. As explained for FIG. 19, the AC coefficients other than zeros are transmitted at the beginning, but the latter portions of the AC coefficients tend to consist of more zeroes. The invention of the second embodiment utilizes this feature, that is, in the DCT coefficients of the MCU unit in the zigzag order, the latter portion of the DCT coefficients is less significant. The present invention reduces the volume of transmitted data by replacing the AC coefficients with zeros in the latter portion of the DCT coefficients. In this case, the DC coefficient is not replaced by zeros. In the second embodiment, at least the DC coefficient is left so that the information about the color difference signal UV portion is not lost.

In order to simplify the explanation, it is assumed here that the output signal DO from the quantizer 4 is arranged in the order of DC, *, *, 0, 0, *, 0, ... 0, * ... * 0, 0, DC, *, *, *,0, ... as shown in FIG. 5D. "DC"s indicate the DC coefficients, the "*" marks indicate the AC coefficients which are not zero and "0"s indicate the AC coefficients which are zero. The zero detecting circuit 11 detects the AC coefficients which are not zeros, and outputs the detected number as DET0 to the counter 12. This DET0 is a pulse output when "*" mark is detected, but it is not shown in FIGS. 5A~5G. When the counter 12 receives the DET0 pulse from the zero detecting circuit 11, the counter 12 increments the count value, and accumulates the value CT1 as shown in FIG. 5E. The MSYNCO signal output in synchronization with the DC coefficients resets the counter 12 for every 64 pixels×3. In FIG. 5C, the number for resetting is generally represented as 64 pixels×n. The second embodiment is a specific case of n=3.

The comparator 15 compares the second reference value (in the present embodiment, for example, 8 in digital value)

with the count of the counter 12. When the count of the counter 12 exceeds the second reference value, the comparator 15 outputs the COM1 (logic "L") as shown in FIG. 5F. In the present second embodiment, for example, the logic circuit 17 is an AND circuit. When the output of the comparator 15 changes to the logic "L", the output of the logic circuit 17 changes to "0". This logic circuit 17 may also be switches, as mentioned above.

When the output from the comparator 15 is "H", that is, when the count of the counter 12 does not exceed the second reference value, the output signal DO from the quantizer 4 passes through without change. The delay adjustment circuit 16 is a circuit for phase adjustment between the output signal from the comparator 15 and DO from the quantizer 4. FIG. 5G illustrates the DCT coefficients (LOG1) output from the logic circuit 17. FIG. 5G shows that, during the time when the output from the comparator 15 is the logic "L", the output of the logic circuit 17 is replaced by "0".

In the second embodiment, all Y signal portions pass through the logic circuit 17, some of the U signals are replaced by zeros, and all the V signal portions except the DC coefficient portions, are replaced by zeros. In this second embodiment, although the larger significant Y signals all pass through the logic circuit 17 to reduce the coding volume as a whole, the coding quality improves. During the time when the output from the comparator 15 is the logic "L", the DO signal output from the quantizer 4 is replaced by 0. Therefore, the data volume for entropy coding in the entropy coder 6 of the next stage can be reduced.

Embodiment 3

Figure 6:
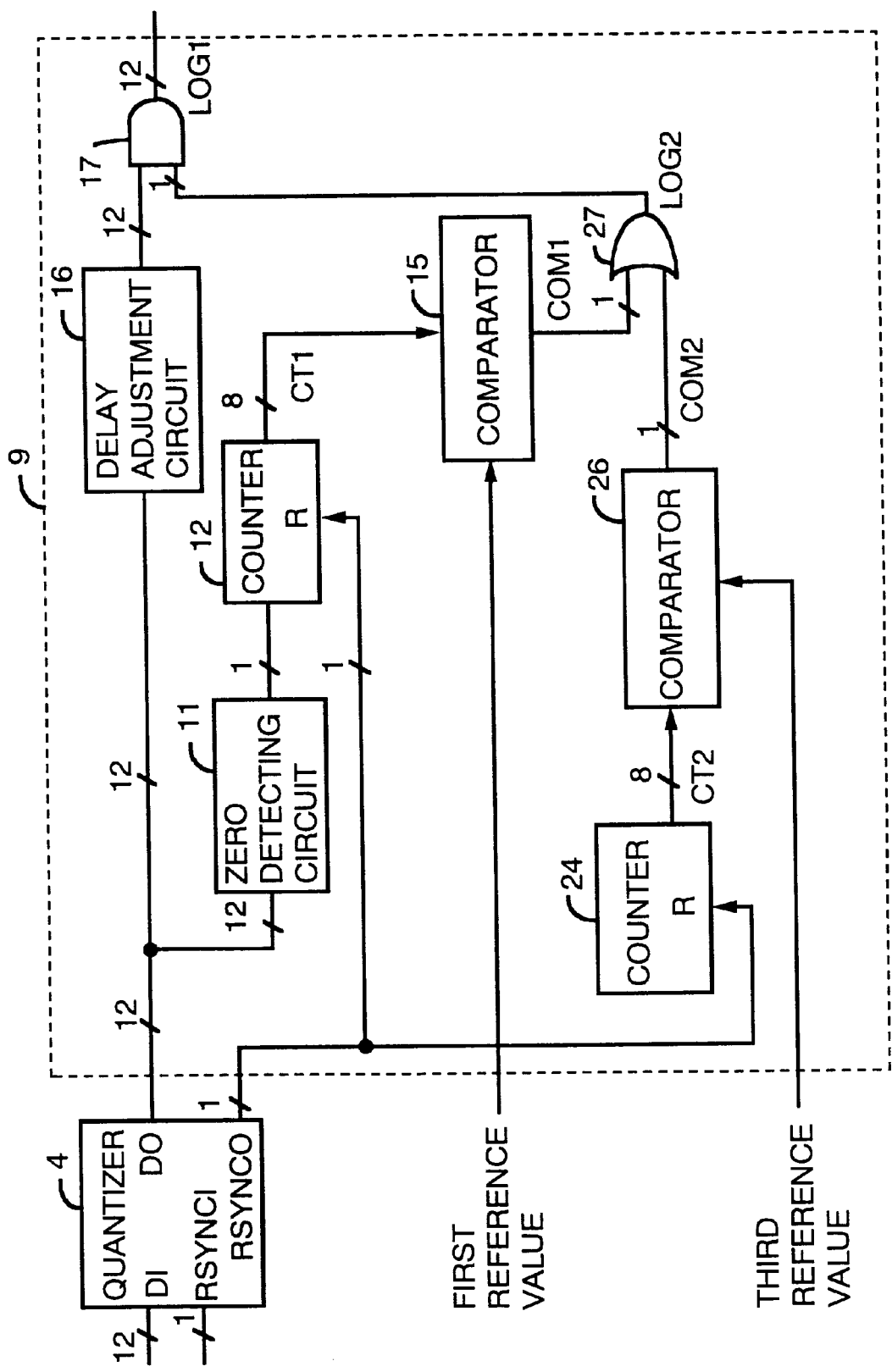
FIG. 6 shows the circuit of a data processing portion for counting the DCT coefficient values other than 0 after quantization and for effectively controlling the code volume according to a third embodiment of the present invention.

FIG. 6 shows a data processor 9 of the image coding apparatus according to a third embodiment of the present invention. The data processor 9 counts the AC coefficients other than zero within the DCT coefficients after the quantization performed by the quantizer 4, and effectively controls the volume of coding. The data processor 9 of FIG. 6 comprises a zero detector 11, a counter 12, a comparator 15, a delay adjustment circuit 16, a logic circuit 17, a second counter 24, a second comparator 26, and a second logic circuit 27.

The operation of the image coding apparatus of the present invention is explained below using FIG. 1 and FIG. 6. First of all, the discrete cosine transformer 2 carries out the two dimensional discrete cosine transformation for every component image comprising 8×8 pixels, and, as a result, 64 DCT coefficients Suv are obtained. The 64 DCT coefficients Suv are transmitted to the zigzag converter 3, and rearranged from a serial order to a zigzag order. The 64 DCT coefficients Suv rearranged in the zigzag order are input to the quantizer 4. The quantizer 4 divides the DCT coefficients Suv by the value Quv of the quantizing table 5. The first of the 64 coefficients Ruv which are rearranged in the zigzag order and quantized, is a DC (direct current) coefficient, and the second to the sixty-fourth coefficients are AC (alternating current) coefficients. The quantizer 4 outputs an RSYNCO (synchronous out) signal synchronized with the output of the DC coefficients. The zero detecting circuit 11 determines if the AC (alternating current) coefficients in the coefficients Ruv output from the quantizer 4 are zero. When the AC coefficients are not zero, the zero detecting circuit 11 outputs a detecting signal DET0. Zero means that the bits comprising the AC coefficients are all zero. The counter 12 counts AC coefficients which are not zero within the coefficients Ruv for every block (for example, 8×8= 64 pixels ). The initial output of the counter 12 is zero. The comparator 15 compares the count of the count 12 and a first reference value. When the count of the counter 12 exceeds the first reference value, the comparator 15 outputs a logic "L". If the count of the counter 12 is equal to or smaller than the first reference value, the comparator 15 outputs a logic "H".

The second counter 24 counts data which is currently output from the quantizer 4 for every block (for example, 8×8 pixels) by counting the number of the clocks. The second comparator 26 compares the third reference value with the count of the second counter 24. When the count of the second counter 24 is equal to or smaller than the third reference value, the second comparator 26 outputs the logic "L". When the count of the second counter 24 exceeds the third reference value, the comparator 26 outputs the logic "H". The third reference value corresponds to a predetermined accumulated number of clock pulses (for example, the third reference value is 58), that is, a certain number in the coefficients Ruv arranged in the zigzag order.

The output of the first comparator 15 and the output of the second comparator 26 are input into the second logic circuit 27. The second logic circuit performs an OR logic function. This second logic circuit 27 may also be constructed of switches. When both of the output of the first comparator 15 and the output of the second comparator 26 are the logic "L", the logic circuit 27 outputs the logic "L". In response to the logic "L" output from the logic circuit 27, all the outputs from the first logic circuit 17 are replaced by zeros. When the output from the logic circuit 27 is logic "H", the output of the quantizer 4 passes through the logic circuit 17 via the delay adjustment circuit 16. This logic circuit 17 may also be constructed of switches, as mentioned above. The delay adjustment circuit 16 temporarily stores the DCT coefficients Ruv for the purpose of delay adjustment. The output data group is transmitted to the entropy coder 6 as required, and the entropy coder 6 Huffman codes the data group.

FIGS. 7A~7I are timing charts explaining the operation of the data processing circuit of FIG. 6. FIG. 7A shows a clock signal (CLK) used in the data processor 9, FIG. 7B shows the RSYNCO signal output from the quantizer 4, FIG. 7C shows the stream DO of the DCT coefficients Ruv output from the quantizer 4, FIG. 7D shows the output value (CT1) of the counter 12, FIG. 7E shows the output value (COM1) of the comparator 15, FIG. 7F shows the counter value (CT2) of the second counter 24, FIG. 7G shows the output (COM2) of the second comparator 26, FIG. 7H shows the output (LOG2) of the second logic circuit 27, and FIG. 7I shows the DCT coefficients Ruv (LOG1) output from the logic circuit 17.

The RSYNCO signal is a pulse output in synchronization with the DC coefficient of the DCT coefficients Suv, and is used for resetting the counter 12 in the data processor 9. A DO signal output comprises one DC coefficient and the succeeding 63 AC coefficients in the zigzag order. As explained for FIG. 19, the AC coefficients other than zeros are transmitted at the beginning, but the latter portions of the AC coefficients tend to consist more of zero. The present invention utilizes this feature, that is, in the DCT coefficients in the zigzag order, the latter portion of the DCT coefficients contains of more zero DCT coefficients. The present invention reduces the volume of transmitted data by replacing the AC coefficients with zeros in the latter portions of the DCT coefficients at the logic circuit 17.

Since contours of characters contain extremely large frequency components, the contours are indicated as AC coefficients in the later portion of the zigzag order. Therefore, in order to make clear the contours of the characters, in the third embodiment, the AC coefficients in the later portion of the zigzag order, for example, the AC coefficients after the fifty-eighth coefficient, are not replaced by zeros. Therefore all the coefficients Ruv after the fifty-eighth in the zigzag order from the quantizer 4 pass through the logic circuit 17. The circuit for achieving this function includes the second counter 24, the second comparator 26 and the second logic circuit 27.

In order to simplify the explanation, it is assumed here that the output signal DO from the quantizer 4 is arranged in the order of DC, *, *, 0, 0, *, 0, . . . 0, . . . * 0, 0, DC, *, *, *,0, . . . as shown in FIG. 7C. "DC"s indicate the DC coefficients, the "*" marks indicate the AC coefficients which are not zero, and "0"s indicate the AC coefficients which are zero. The zero detecting circuit 11 detects the AC coefficients which are not zeros and outputs the detected number as DET0 to the counter 12. This DET0 is a pulse output when the "*" AC coefficient which is not zero is detected, and is not shown in FIGS. 7A~7I. When the counter 12 receives the DET0 pulse from the zero detecting circuit 11, the counter 12 increments the count, and accumulates the count CT1 as shown in FIG. 7D. The MSYNCO signal output in synchronization with the DC coefficients resets the counter 12 for every 8×8=64 pixels. The comparator 15 compares the first reference value (for example, a digital value 8 in the present embodiment) with the count of the counter 12. If the count of the counter 12 exceeds the first reference value, the comparator 15 outputs the COM1 (logic "L") as shown in FIG. 7E.

On the contrary, the second counter 24 continues to count the clocks (CT2) until the second counter 24 is reset by the RSYNCO signal from the quantizer 4 as shown in FIG. 7F. That is, since the RSYNCO signal is output for every 64 clocks, the clock is accumulated until reaching the maximum value of 64. After the count of the second counter 24 increases to 63, the accumulation value is reset by the RSYNCO signal. Then the accumulation value returns to zero, and the clocks are again counted from zero to 63 in sequence. This count indicates the number of the data which is currently output from the quantizer 4 for every block (for example, 8×8 pixels). The second comparator 26 compares the third reference value with the count of the second counter 24. If the count of the second counter 24 is equal to or smaller than the third reference value, the second comparator 26 outputs the logic "L". If the count of the second counter 24 exceeds the third reference value, the second comparator 26 outputs the logic "H" (COM2), as shown in FIG. 7G. The third reference value corresponds to the predetermined accumulated number of the clock pulses (for example, the third reference value is 58), that is, a certain number in the coefficients Ruv arranged in the zigzag order.

The output (FIG. 7E) of the first comparator 15 and the output (FIG. 7G) of the second comparator 26 are input into the second logic circuit 27. The second logic circuit performs an OR logic function. This second logic circuit 27 may also be constructed of switches. When both of the output of the first comparator 15 and the output of the second comparator 26 are logic "L", the logic circuit 27 outputs the logic "L" (FIG. 7H). In response to the logic "L" output from the logic circuit 27, all the outputs from the first logic circuit 17 are replaced by zeros. When the output from the logic circuit 27 is logic "H", the output of the quantizer 4 passes through the logic circuit 17 via the delay adjustment circuit 16 (FIG. 7I). This logic circuit 17 may also be constructed of switches, as mentioned above. The delay adjustment circuit 16 temporarily stores the DCT coefficients Ruv for the purpose of the delay adjustment. The output data group is transmitted to the entropy coder 6 as required, and the entropy coder 6 Huffman codes the data group.

As explained above, during the time when the output of the second logic circuit 27 is the logic "L", the DO signal output from the quantizer 4 is replaced by "0". Therefore, it is possible to reduce the volume of data to be entropy coded in the entropy coder 6 of the succeeding stage. Moreover, during the time when the output of the second logic circuit 27 is the logic "H", the DO signal output from the quantizer 4 passes through the logic circuit 17. Therefore, the contours of the characters containing the extremely large frequency components are adequately transmitted, and therefore the contours of the characters are made clear.

Embodiment 4

Figure 8:
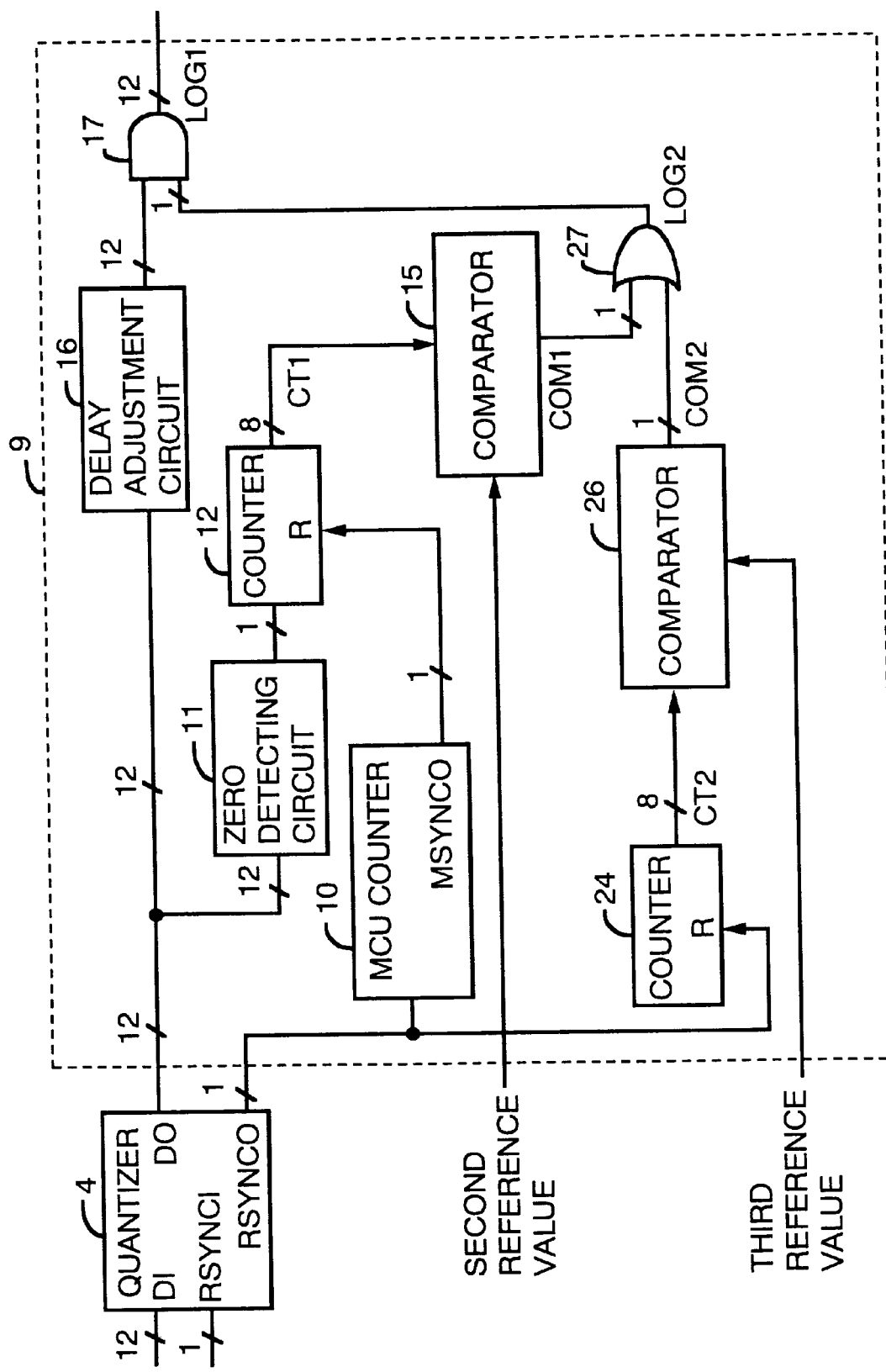
FIG. 8 shows the circuit of a data processing portion for counting the DCT coefficient values other than 0 after quantization and for effectively controlling the code volume according to a fourth embodiment of the present invention.

FIG. 8 shows a data processor 9 in the image coding apparatus according to a fourth embodiment of the present invention. The data processor 9 counts the AC coefficients other than zeros within the DCT coefficients after the quantization performed by the quantizer 4, and effectively controls the volume of coding. The data processor 9 of FIG. 8 comprises a zero detector 11, a first counter 12, an MCU (Minimum Coded Unit) counter 10, a comparator 15, a delay adjustment circuit 16, a first logic circuit 17, a second counter 24, a second comparator 26, and a second logic circuit 27.

The operation of the image coding apparatus of the present invention is explained below using FIG. 1 and FIG. 8. First of all, the discrete cosine transformer 2 carries out the two dimensional discrete cosine transformation for every component image comprising 8×8 pixels, and, as a result, 64 DCT coefficients Suv are obtained. The 64 DCT coefficients Suv are transmitted to the zigzag converter 3, and rearranged from a serial order to a zigzag order. The 64 DCT coefficients Suv rearranged in the zigzag order are input to the quantizer 4. The quantizer 4 divides the DCT coefficients Suv by the value Quv of the quantizing table 5. The first of the 64 coefficients Ruv, which are rearranged in the zigzag order and quantized, is a DC (direct current) coefficient, and the second to the sixty-fourth coefficients are AC (alternating current) coefficients. The quantizer 4 outputs an RSYNCO (synchronous out) signal synchronized with the output of the DC coefficients. The MCU counter 10 counts the number of the blocks (for example, 8×8 pixels), and outputs an MSYNCO signal for every head portion of the MCU, which is a basic unit of the process. Examples of the MCUs (Minimum Coded Units) are YUV, YYUV and YYYYUV.

Where, Y represents a intensity signal and an UV represents a color difference signal. The fourth embodiment, in which these MCUs are used, is applied in a situation where, for example, the intensity Y is more significant than the color difference signal UV. In other words, the fourth embodiment is applied when the intensity signal Y needs to be transmitted without change, to the extent possible, and when the AC components of the color difference signal UV can be replaced by zero, since human eyes are sensitive to the intensity signal.

The zero detecting circuit 11 determines if the AC (alternating current) coefficients in DCT coefficients Ruv output from the quantizer 4 are zero (for example, all 12 bits of the AC coefficients are zero), and outputs a detecting signal DET0 if the AC coefficients are not zero. The counter 12 counts the AC coefficients in the coefficients Ruv which are not zero, for every block (for example 8×8=64 pixels). The initial value of the output value of the counter 12 is zero. The comparator 15 compares the count of the counter 12 with a first reference value. When the count of the counter 12 exceeds the first reference value, the comparator 15 outputs a logic "L". If the count of the counter 12 is equal to or smaller than the first reference value, the comparator 15 outputs a logic "H".

The second counter 24 counts the number of the data which is currently output from the quantizer 4 for every block (for example, 8×8 pixels) by counting the number of the clocks. The second comparator 26 compares the third reference value with the count of the second counter 24. When the count of the second counter 24 is equal to or smaller than the third reference value, the second comparator 26 outputs the logic "L". When the count of the second counter 24 exceeds the third reference value, the comparator 26 outputs the logic "H". The third reference value corresponds to the accumulated number of the clocks (for example, the third reference value is 58), that is, a certain number in the coefficients Ruv arranged in the zigzag order.

The output of the first comparator 15 and the output of the second comparator 26 are input into the second logic circuit 27. The second logic circuit performs an OR logic function. This second logic circuit 27 may also be constructed of switches. When both of the output of the first comparator 15 and the output of the second comparator 26 are the logic "L", the logic circuit 27 outputs the logic "L". In response to the logic "L" output from the logic circuit 27, all the outputs from the first logic circuit 17 are replaced by zeros. When the output from the logic circuit 27 is logic "H", the output of the quantizer 4 passes through the logic circuit 17 via the delay adjustment circuit 16. The delay adjustment circuit 16 temporarily stores the DCT coefficients Ruv for the purpose of delay adjustment. The output data group is transmitted to the entropy coder 6 as required, and the entropy coder 6 Huffman codes the data group.

Figure 9:
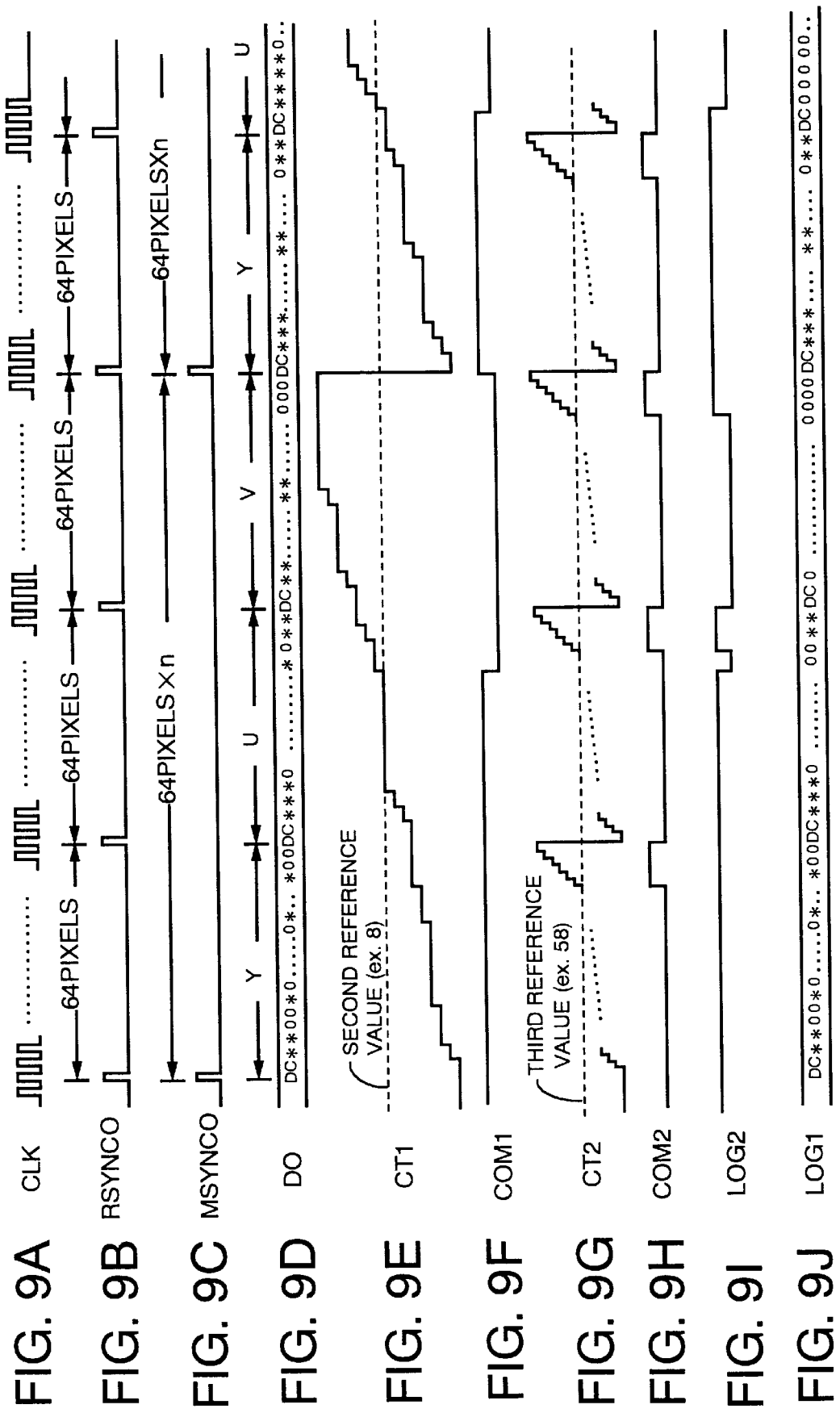
FIGS. 9A~9J are timing charts explaining the operation of the data processing circuit of FIG. 8.

FIGS. 9A~9J are timing charts explaining an operation of the data processing circuit of FIG. 8. FIG. 9A shows a clock signal (CLK) used in the data processor 9, FIG. 9B shows the RSYNCO signal output from the quantizer 4, FIG. 9C shows MSYNCO signal output from the counter 10, FIG. 9D shows the stream DO of the DCT coefficients Ruv output from the quantizer 4, FIG. 9E shows the output value (CT1) of the comparator 15, FIG. 9F shows the output value (COM1) of the first comparator 15, FIG. 9G shows the count (CT2) of the second counter 24, FIG. 9H shows the output (COM2) of the second comparator 26, FIG. 9I shows the output (LOG2) of the second logic circuit 27, and FIG. 9J shows the DCT coefficients Ruv (LOG1) output from the logic circuit 17.

The RSYNCO signal is a pulse output in synchronization with the DC coefficient of the DCT coefficients Suv. The MCU counter 10 counts the RSYNCO signal. For example, since FIG. 9D assumes that the unit of the MCU is YUV, the count of the RSYNCO signals in the MCU counter 10 corresponds to the number of YUV, that is, 3. Therefore, the reset pulse MSYNCO signal is generated for every 64 pixels×3 as shown in FIG. 9C. If it is assumed that the unit of the MCU is YYYYUV, the count number of the MCU counter 10 is 6. In this case, the reset pulse MSYNCO signal is generated for every 64 pixels×6.

A DO signal output comprises one DC coefficient and the succeeding 63 AC coefficients in the zigzag order. As explained in FIG. 19, the AC coefficients consisting coefficients other than zeros are transmitted at the beginning, but the latter portions of the AC coefficients tend to consist of more zeros. The invention of the fourth embodiment utilizes this feature, that is, in the DCT coefficients of the MCU unit in the zigzag order, the latter portion of the DCT coefficients is less significant. The present invention reduces the volume of transmitted data by replacing the AC coefficients with zeros in the latter portions of the DCT coefficients. In this case, the DC coefficient is not replaced by zeros. In the fourth embodiment, at least the DC coefficient is left so that the information about the color difference signal UV portion is not lost.

In order to simplify the explanation, it is assumed here that the output signal DO from the quantizer 4 is arranged in the order of DC, *, *, 0, 0, *, 0, . . . 0,* . . . * 0, 0, DC, *, * ,0, . . . as shown in FIG. 9D. "DC"s indicate the DC coefficients, the "*" marks indicate the AC coefficients which are not zeros and "0"s indicate the AC coefficients which are zeros. The zero detecting circuit 11 detects the AC coefficients which are not zeros, and outputs the detected number as DET0 to the counter 12. This DET0 is a pulse output when "*" mark is detected, but it is not shown in FIGS. 9A~9J. When the counter 12 receives the DET0 pulse from the zero detecting circuit 11, the counter 12 increments the count, and accumulates the count CT1 as shown in FIG. 9E (CT1). The MSYNCO signal output in synchronization with the DC coefficients resets the counter 12 for every 64 pixels×3. In FIG. 9C, the number for resetting is generally represented as 64 pixels×n. The fourth embodiment is a specific case of n=3.

The comparator 15 compares the second reference value (in the present embodiment, for example, 8 in digital value) with the count (CT1) of the counter 12. When the count of the counter 12 exceeds the second reference value, the comparator 15 outputs the logic "L" as shown in FIG. 9F (COM1).

The second counter 24 continues to count the clocks (CLK) until the second counter 24 is reset by the RSYNCO signal from the quantizer 4 as shown in FIG. 9G (CT2). That is, since the RSYNCO signal is output for every 64 clocks, the clock is accumulated until reaching a maximum counts of 64. After the count of the second counter 24 increases to 63, the accumulation value is reset by the RSYNCO signal. Then the accumulation value returns to zero, and the clocks are again counted from zero to 63 in sequence. This count (CT2) shows the number of the data which is currently output from the quantizer 4 for every block (for example, 8×8 pixels). The second comparator 26 compares the third reference value with the count of the second counter 24. If the count of the second counter 24 is equal to or smaller than the third reference value, the second comparator 26 outputs the logic "L". If the count value of the second counter 24 exceeds the third reference value, the second comparator 26 outputs the logic "H" (COM2), as shown in FIG. 9U. The third reference value corresponds to the predetermined accumulated number of the clock pulses (for example, the third reference value is 58), that is, a certain number in the coefficients Ruv arranged in the zigzag order.

The output (COM1) (FIG. 9E) of the first comparator 15 and the output (COM2) (FIG. 9H) of the second comparator 26 are input into the second logic circuit 27. The second logic circuit performs an OR logic function. This second logic circuit 27 may also be constructed of switches. When both of the output of the first comparator 15 and the output of the second comparator 26 are logic "L", the logic circuit 27 outputs the logic "L" (LOG2) (FIG. 9I). In response to the logic "L" output from the logic circuit 27, all the outputs from the first logic circuit 17 are replaced by zeros. When the output from the logic circuit 27 is logic "H", the output of the quantizer 4 passes through the logic circuit 17 via the delay adjustment circuit 16 (LOG1) (FIG. 9J). This logic circuit 17 may also be constructed of switches, as mentioned above. The delay adjustment circuit 16 temporarily stores the DCT coefficients Ruv for delay adjustment. The output data group is transmitted to the entropy coder 6 as required, and the entropy coder 6 Huffman codes the data group.

As explained above, during the time when the output (LOG2) of the second logic circuit 27 is the logic "L", the DO signal output from the quantizer 4 is replaced by "0". Therefore, it is possible to reduce the volume of data to be entropy coded in the entropy coder 6 of the succeeding stage. Moreover, during the time when the output (LOG2) of the second logic circuit 27 is the logic "H", the DO signal output from the quantizer 4 passes through the logic circuit 17. Therefore, the contours of characters containing the extremely large frequency components are adequately transmitted, and therefore the contours of the characters are made clear.

In the fourth embodiment, all Y signal portions pass through the logic circuit 17, some of the U signals are replaced by zeros, and all the V signal portions except the DC coefficient portions are replaced by zeros. In this fourth embodiment, although the larger significant Y signals all pass through the logic circuit 17 to reduce the volume of coding as a whole, the coding quality improves. During the time when the output from the comparator 15 is the logic "L", the DO signal output from the quantizer 4 is replaced by 0. Therefore, the volume of data for entropy coding in the entropy coder 6 of the next stage can be reduced.

Embodiment 5

Figure 10:
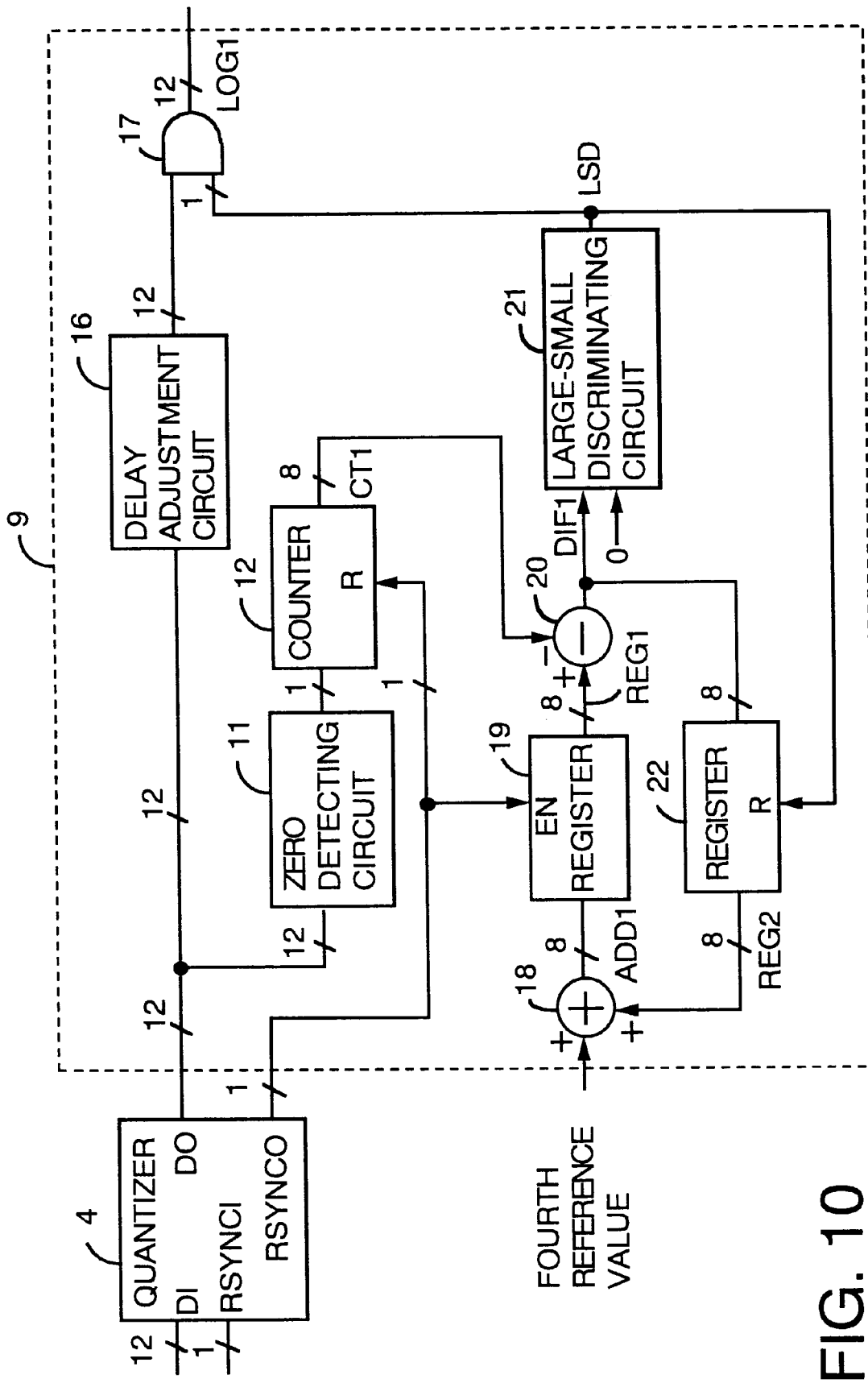
FIG. 10 shows the circuit of a data processing portion for counting the DCT coefficient values other than 0 after quantization and for effectively controlling the code volume according to a fifth embodiment of the present invention.

FIG. 10 shows a data processor 9 of the image coding apparatus according to a fifth embodiment of the present invention. The data processor 9 counts the AC coefficients that are not zero within the DCT coefficients after the quantization performed by the quantizer 4, and effectively controls the coding volume. The data processor 9 of FIG. 10 comprises a zero detector 11, a counter 12, a delay adjustment circuit 16, a logic circuit 17, an adder 18, a first register 19, a subtractor 20, a large-small discriminating circuit 21, and a second register 22.

The operation of the image coding apparatus of the present invention is explained below using FIG. 1 and FIG. 10. First of all, the discrete cosine transformer 2 carries out the two dimensional discrete cosine transformation for every component image comprising 8×8 pixels, and, as a result, 64 DCT coefficients Suv are obtained. The 64 DCT coefficients Suv are transmitted to the zigzag converter 3, and rearranged from a serial order to a zigzag order. The 64 DCT coefficients Suv rearranged in the zigzag order is input to the quantizer 4. The quantizer 4 divides the DCT coefficients Suv by the value Quv of the quantizing table 5. The first of the 64 coefficients Ruv, which are rearranged in the zigzag order and quantized, is a DC (direct current) coefficient, and the second to the sixty-fourth coefficients are AC (alternating current) coefficients. The quantizer 4 outputs an RSYNCO (synchronous out) signal synchronized with the output of the DC coefficients. The zero detecting circuit 11 determines if the AC (alternating current) coefficients in the coefficients Ruv output from the quantizer 4 are zero. When the AC coefficients are not zero, the zero detecting circuit 11 outputs a detecting signal DET0. Zero data means that the bits comprising the AC coefficients are all zero. The counter 12 counts the AC coefficients which are not zero within the coefficients Ruv for every block (for example, 8×8=64 pixels). The initial output of the counter 12 is zero. The first register 19 temporarily stores the output from the adder 18 in synchronization with the RSYNCO signal. Initially, the first register 19 stores the fourth reference value. The subtractor 20 subtracts the count of the counter 12 (CT1) from the value of the first register 19 (REG1). The second register 22 temporarily stores the output value of the subtractor 20. The adder 18 adds the fourth reference value and the value of the second register 22, and outputs the result (ADD1). When the output value (DIF1) of the subtractor 20 is equal to or smaller than zero, in other words the count of the counter 12 (CT1) exceeds the value (REG1) of the first register 19(CT1>REG1), the large-small discriminating circuit 21 outputs the logic "L" signal. When the output value of the subtractor 20 exceeds zero, in other words the count of the counter 12 (CT1) is equal to or smaller than the value (REG1) of the first register (CT1≦REG1), the large-small discriminating circuit 21 outputs the logic "H". The register 16 for delay adjustment temporarily stores the coefficients Ruv for the purpose of delay adjustment.

Figure 11:
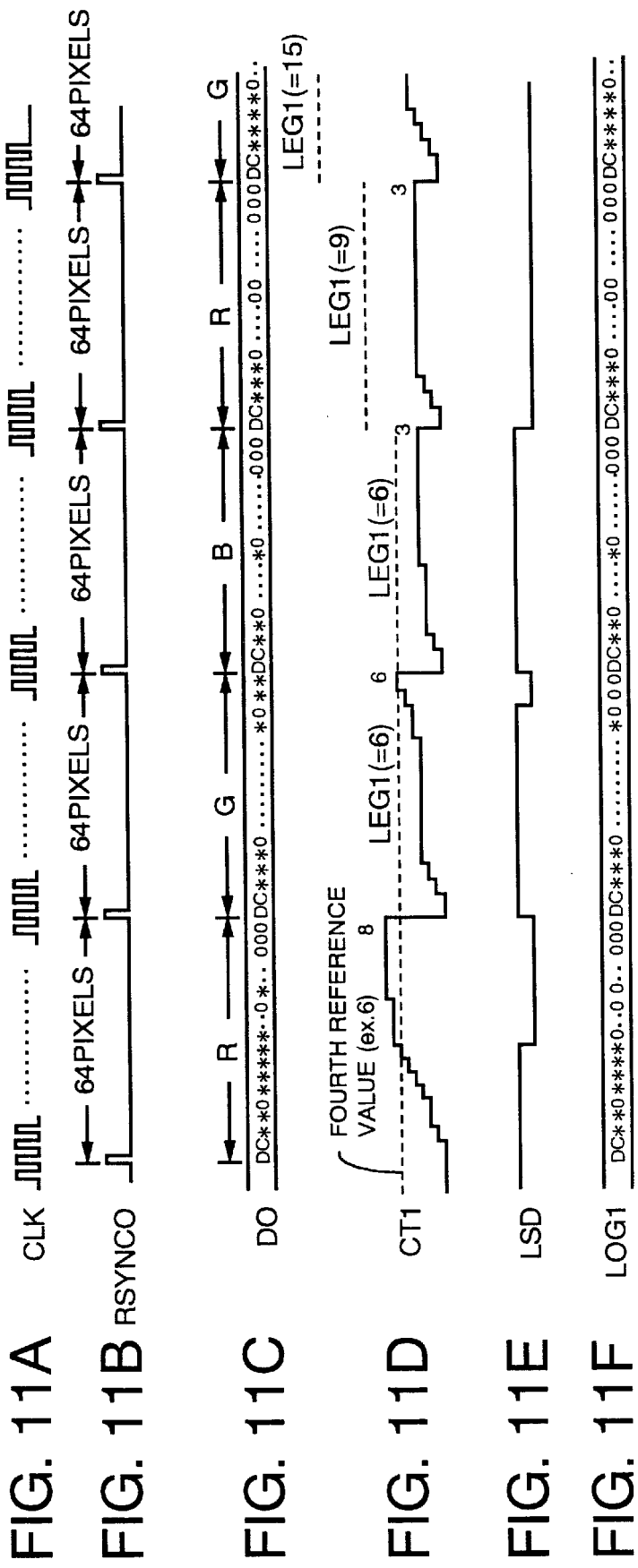
FIGS. 11A~11F are timing charts explaining the operation of the data processing circuit of FIG. 10.

FIGS. 11A~11F are timing charts explaining an operation of the data processing circuit of FIG. 10. FIG. 11A shows a clock signal (CLK) used in the data processor 9, FIG. 11B shows the RSYNCO signal output from the quantizer 4, FIG. 11C shows the stream DO of the DCT coefficients Ruv output from the quantizer 4, FIG. 11D shows the output count (CT1) of the counter 12, FIG. 11E shows the output value (LSD) of the large-small discriminating circuit 21, and FIG. 11F shows the DCT coefficients Ruv (LOG1) output from the logic circuit 17.

The RSYNCO signal is a pulse output in synchronization with the DC coefficient of the DCT coefficients Suv, and is used for resetting the counter 12 in the data processor 9. A DO signal output comprises one DC coefficient and the succeeding 63 AC coefficients in the zigzag order. As explained in FIG. 19, the AC coefficients other than zero are transmitted at the beginning, but the latter portions of the AC coefficients tend to consist of more zeros. The present invention utilizes this feature, that is, in the DCT coefficients in the zigzag order, the latter portion of the DCT coefficients contains more zero DCT coefficients. The present invention reduces the volume of the transmitted data by replacing the AC coefficients with zeros in the latter portions of the DCT coefficients at the logic circuit 17.

When the count of the counter 12 does not reach the predetermined reference value, it is not necessary to replace the AC coefficients with zeros. Therefore, in such a situation, the count which did not reach the reference value is added to the next reference to change the predetermined reference value, and the rounded-down data volume can be reduced. In the fourth embodiment, the data processing circuit 9 is includes a circuit for changing the predetermined reference value according to the count of the counter 12. The circuit for achieving such a function includes the adder 18, the first register 19, the second register 22, and the subtractor 20.

In order to simplify the explanation, it is assumed here that the output signal DO from the quantizer 4 is arranged in the order of DC, *, *, 0, *, *, *, **, 0, . . . 0,* . . . * 0, 0, DC, *, *, *, 0, . . . as shown in FIG. 11C. "DC"s indicate the DC coefficients, the "*" marks indicate the AC coefficients which are not zeros, and "0"s indicate the AC coefficients which are zeros. The zero detecting circuit 11 detects the AC coefficients which are not zeros and outputs the detected number as DET0 to the counter 12. This DET0 is a pulse output when "*" AC coefficient which is not zero is detected, and is not shown in FIGS. 11A~11F.

When the counter 12 receives the DET0 pulse from the zero detecting circuit 11, the counter 12 increments the count, and accumulates the count CT1 as shown in FIG. 11D (CT1). The RSYNCO signal output in synchronization with the DC coefficients resets the counter 12 for every 8×8=64 pixels.

The first register 19 stores the fourth reference value (in the fifth embodiment, for example, 6). The first register 19 operates and outputs the stored value when the RSYNCO signal is input (REG1). The subtractor 20 subtracts the count of the counter 12 (CT1) from the value of the first register 19 (REG1), and sends the resultant value (DIF1) to the second register 22 where it is stored. The subtractor 20 outputs the resultant value (DIF1) to the large-small discriminating circuit 21. However, when the output of the large-small discriminating circuit 21 is "L" (when DIF1 is equal or smaller than zero), the second register 22 is cleared to zero.

The relationship between the transition of the stored value (REG1) of the first register 19 and the output (LSD) from the large-small discriminating circuit 21 is explained below. At the initial state, the fourth reference value, for example, value 6 here, is stored in the first register 19. Therefore, the value of the output (REG1) from the first register 19 becomes 6. The subtractor 20 subtracts the count CT1 of the counter 12 from the output (REG1) of the first register 19, and outputs the resultant signal DIF1. At this time, the value of REG1 is changed only when the RSYNCO signal is input, the value is maintained. The count CT1 of the counter 12 is incremented for every clock pulse, and compared with REG1, and DIF1 is output from the subtractor 20 for every clock pulse. This DIF1 is stored in the second register 22, but readout is brought about by the RSYNCO signals. The adder 18 adds the fourth reference value and the output signal REG2 of the second register 22 every time when the RSYNCO signal is input, and the register 19 increments the result ADD1.

The output DIF1 of the subtractor 20 is input to the large-small discriminating circuit 21. When the value of the DIF1 is smaller than zero, in other words, the count CT1 of the counter 12 exceeds the value REG1 of the first register 19, the large-small discriminating circuit 21 outputs the logic "L" signal. On the contrary, when the value of the DIF1 is equal to or larger than zero, in other words, the count CT1 of the counter 12 is equal to or smaller than the value REG1 of the register 19, the large-small discriminating circuit 21 outputs the "H" signal.

All of the outputs from the logic circuit 17 are replaced by zeros when the output LSD of the large-small discriminating circuit 21 is logic "L". This logic circuit 17 may also be constructed of switches. When the output LSD of the large-small discriminating circuit 21 is "H", the output from the quantizer 4 passes through the logic circuit 17 via the delay adjustment circuit 16 (LOG1). The delay adjustment circuit 16 temporarily stores the DCT coefficients Ruv for the purpose of delay adjustment. The output data group is transmitted to the entropy coder 6 as required, and the entropy coder 6 Huffman codes the data group.

As explained above, during the time when the output of the second logic circuit 27 is the logic "L", the DO signal output from the quantizer 4 is "0". Therefore, it is possible to reduce the volume of data to be entropy coded in the entropy coder 6 of the succeeding stage.

Furthermore, it is possible to adjust the predetermined fourth reference value to an appropriate reference value every time the RSYNCO signal arrives, by constantly comparing the count CT1 of the counter 12 and the REG1 of the first register 19, and by transferring the content of the first register 19 according to the result of the comparison. Since the adjustment of the fourth reference value becomes possible, it also becomes possible to add the amount which did not reach the predetermined reference value to the next reference value. By changing the reference value to the larger value, the number of AC coefficients which are not zeros can be reduced, even though those AC coefficients had been rounded down, and the volume of data being rounded down can be reduced.

Embodiment 6

Figure 12:
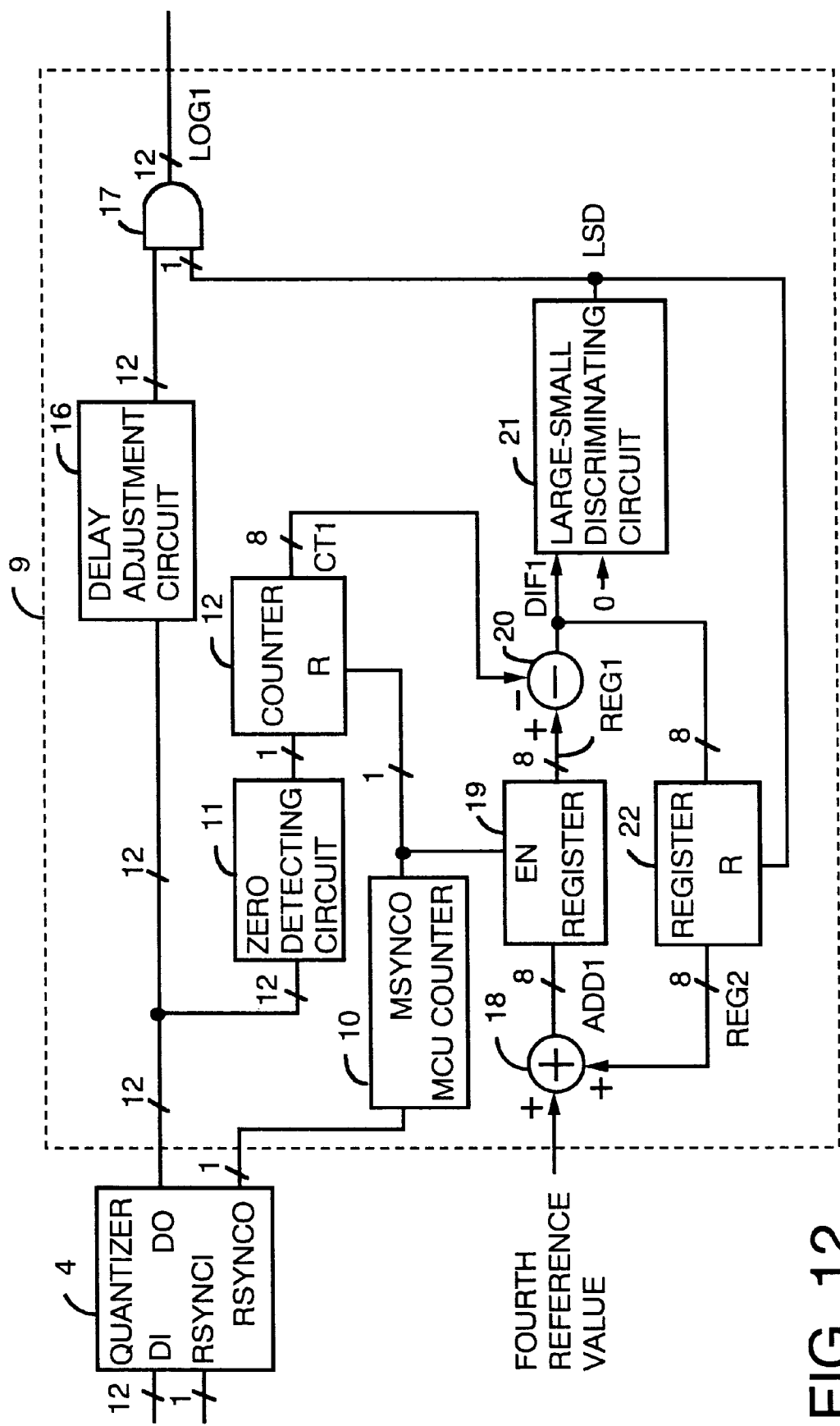
FIG. 12 shows the circuit of a data processing portion for counting the DCT coefficient values other than 0 after quantization and for effectively controlling the code volume according to a sixth embodiment of the present invention.

FIG. 12 shows a data processor 9 of the image coding apparatus according to a sixth embodiment of the present invention. The data processor 9 counts the number of the AC coefficients other than zeros within the DCT coefficients after the quantization performed by the quantizer 4, and effectively controls the coding amount. The data processor 9 of FIG. 12 comprises a zero detector 11, a counter 12, an MCU counter 10, a delay adjustment circuit 16, a first logic circuit 17, an adder 18, a first register 19, a subtractor 20, a large-small discriminating circuit 21, and a second register 22.

The operation of the image coding apparatus of the present invention is explained below using FIG. 1 and FIG. 12. First of all, the discrete cosine transformer 2 carries out the two dimensional discrete cosine transformation for every component image comprising 8×8 pixels, and, as a result, 64 DCT coefficients Suv are obtained. The 64 DCT coefficients Suv are transmitted to the zigzag converter 3, and rearranged from a serial order to a zigzag order. The 64 DCT coefficients Suv rearranged in the zigzag order are input to the quantizer 4. The quantizer 4 divides the DCT coefficients Suv by the value Quv of the quantizing table 5. The first of the 64 coefficients Ruv, which are rearranged in the zigzag order and quantized, is a DC (direct current) coefficient, and the second to the sixty-fourth coefficients are AC (alternating current) coefficients. The quantizer 4 outputs an RSYNCO (synchronous out) signal synchronized with the output of the DC coefficients. The MCU counter 10 counts the number of the blocks (for example, 8×8 pixels), and outputs an MSYNCO signal for every head portion of the MCU, which is a basic unit of the process. Examples of the MCUs (Minimum Coded Units) are YUV, YYUV and YYYYUV.

Y represents a intensity signal and UV represents a color difference signal. The sixth embodiment, in which these MCUs are used, is applied in a situation where, for example, the intensity Y is more significant than the color difference signal UV. In other words, the sixth embodiment is applied in a ease that the intensity signal Y needs to be transmitted without change as much as possible, and the AC components of the color difference signal UV can be replaced by zero, since the human eyes are characterized by sensitivity to the intensity signal.

In FIG. 12, the zero detecting circuit 11 determines whether the AC (alternating current) coefficients in the coefficients Ruv output from the quantizer 4 are zero, and when the AC coefficients are not zero, the zero detecting circuit 11 outputs a detecting signal DET0. The counter 12 counts the number (CT1) of the AC coefficients which are not zero within the coefficients Ruv for every MCU. The first register 19 temporarily stores the output of the adder 18 in synchronization with the MSYNCO signal. The subtractor 20 subtracts the count of the counter 12 (CT1) from the value of the first register 19 (REG1). The second register 22 temporarily stores the output value of the subtractor 20. This value of the register 22 is cleared to zero when the output of the large-small discriminating circuit 21 is "L" (when the DIF1 is smaller than zero). The adder 18 adds the fourth reference value and the value of the second register 22 (REG2). Initially, the first register 19 stores the value of the fourth reference value. The large-small discriminating circuit 21 outputs the logic "L", when the output value of the subtractor 20 is smaller than zero, that is the output count (CT1) of the counter 12 exceeds the first value (REG1) of the first register 19. The large-small discriminating circuit 21 outputs the logic "H", when the output value of the subtractor 20 is equal to or smaller than zero, that is, the count of the first counter 12 is equal to or smaller than the value of the first register 19.

When the output (LSD) of the large-small discriminating circuit 21 is "L", all the outputs of the logic circuit 17 are replaced by zero. This first logic circuit 17 may also be constructed of switches. In another case, the output of the quantizer 4 passes through the logic circuit 17 via the delay adjustment circuit 16. The delay adjustment circuit 16 temporarily stores the DCT coefficients Ruv for the purpose of the delay adjustment. The output data group is transmitted to the entropy coder 6 as required, and the entropy coder 6 Huffman codes the data group.

Figure 13:
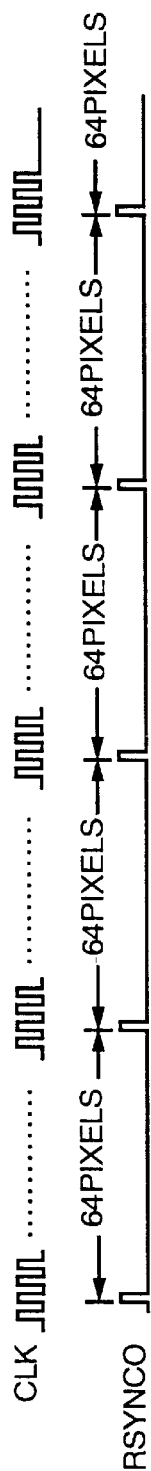
FIGS. 13A~13G are timing charts explaining the operation of the data processing circuit of FIG. 12.

FIGS. 13A~13G are timing charts explaining an operation of the data processing circuit of FIG. 12. FIG. 13A shows a clock signal (CLK) used in the data processor 9, FIG. 13B shows the RSYNCO signal output from the quantizer 4, FIG. 13C shows the MSYNCO signal output from the MCU counter 10, FIG. 13D shows the stream DO of the DCT coefficients Ruv output from the quantizer 4, FIG. 13E shows the output count (CT1) of the counter 12, FIG. 13F shows the output value (LSD) of the large-small discriminating circuit 21, and FIG. 13G shows the DCT coefficients Ruv (LOG1) output from the logic circuit 17.

The RSYNCO signal is a pulse output in synchronization with the DC coefficient of the DCT coefficients Suv. The MCU counter 10 counts the RSYNCO signal. For example, since FIG. 13D assumes that the unit of the MCU is YUV, the count the RSYNCO signals in the MCU counter 10 corresponds to the number of YUV, that is, 3. Therefore, the reset pulse MSYNCO signal is generated for every 64 pixels×3 as shown in FIG. 13C. If it is assumed that the unit of the MCU is YYYYUV, the count of the MCU counter 10 is 6. In this case, the reset pulse MSYNCO signal is generated for every 64 pixels×6.

A DO signal output comprises one DC coefficient and the succeeding 63 AC coefficients in the zigzag order. As explained in FIG. 19, the AC coefficients other than zeros are transmitted at the beginning, but the latter portions of the AC coefficients tend to consist of more zeros. The invention of the fifth embodiment utilizes this feature, that is, in the DCT coefficients of the MCU unit in the zigzag order, the latter portion of the DCT coefficients is less significant. The present invention reduces the volume of transmitted data by replacing the AC coefficients with zeros in the latter portions of the DCT coefficients. In this case, the DC coefficient is not replaced by zero. In the fifth embodiment, at least the DC coefficient is left so that the information about the color difference signal UV portion is not lost.

In order to simplify the explanation, it is assumed here that the output signal DO from the quantizer 4 is arranged in the order of DC, *, *, 0, *, *, *, *, *, *, . . . 0,* . . . * 0, 0, DC, *, *, *, 0, . . . as shown in FIG. 9D. "DC"s indicate the DC coefficients, the "*" marks indicate the AC coefficients which are not zeros, and "0"s indicate the AC coefficients which are zero. The zero detecting circuit 11 detects the AC coefficients which are not zeros, and outputs the detected number as DET0 to the counter 12. This DET0 is a pulse output when "*" mark is detected, but it is not shown in FIGS. 13A~13G. When the counter 12 receives the DET0 pulse from the zero detecting circuit 11, the counter 12 increments the count, and accumulates the count CT1 as shown in FIG. 13E. The MSYNCO signal output in synchronization with the DC coefficients resets the counter 12 for every 64 pixels×3. In FIG. 13C, the number for resetting is generally represented as 64 pixels×n. The sixth embodiment is a specific case of n=3.

The first register 19 stores the fourth reference value (in the six embodiment, for example, 11). The first register 19 operates and outputs the stored value (REG1) when the RSYNCO signal is input. The subtractor 20 subtracts the count (CT1) of the counter 12 from the value (REG1) of the first register 19, and sends the resultant value (DIF1) to the second register 22 where it is stored. The subtractor 20 outputs the resultant value (DIF1) to the large-small discriminating circuit 21.

The relationship between the transition of the store value (REG1) of the first register 19 and the output (LSD) from the large-small discriminating circuit is explained below. At the initial state, the fourth reference value, for example value 11 here, is stored in the first register 19. Therefore, the value of the output (REG1) from the first register 19 becomes 11. The subtractor 20 subtracts the count CT1 of the counter 12 from the output (REG1) of the first register 19, and outputs the signal DIF1. At this time, the value of REG1 is changed only when there is an input of the MSYNCO signal, the value is maintained. The count CT1 of the counter 12 is incremented for every clock pulse (CLK), compared with REG 1, and DIF1 is output for respective clock pulses. This DIF1 is stored in the second register 22, but readout is brought about by the RSYNCO signals. When the output of the large-small discriminating circuit 21 is "L" (when DIF1 is equal to or smaller than zero), the value stored in the second register 22 is cleared to zero. The adder 18 adds the fourth reference value and the output signal REG2 of the second register 22 every time the MSYNCO signal is input, and the register 19 increments the result ADD1.

The output DIF1 of the subtractor 20 is input to the large-small discriminating circuit 21. When the value of the DIF1 is smaller than zero, in other words the count CT1 of the counter 12 exceeds the value REG1 of the first register 19, the large-small discriminating circuit 21 outputs the logic "L" signal. On the contrary, when the value of the DIF1 is equal to or larger than zero, in other words, the count CT1 of the counter 12 is equal to or smaller than the value REG1 of the register 19, the large-small discriminating circuit 21 outputs the "H" signal.

All of the outputs of the logic circuit 17 are replaced by zeros when the output LSD of the large-small discriminating circuit 21 "L". This logic circuit 17 may also be constructed of switches. When the output LSD of the large-small discriminating circuit 21 is "H", the output from the quantizer 4 passes through the logic circuit 17 via the delay adjustment circuit 16. The delay adjustment circuit 16 temporarily stores the DCT coefficients Ruv for the purpose of delay adjustment. The output data group is transmitted to the entropy coder 6 as required, and the entropy coder 6 the Huffman codes the data group.

Embodiment 7

Figure 14:
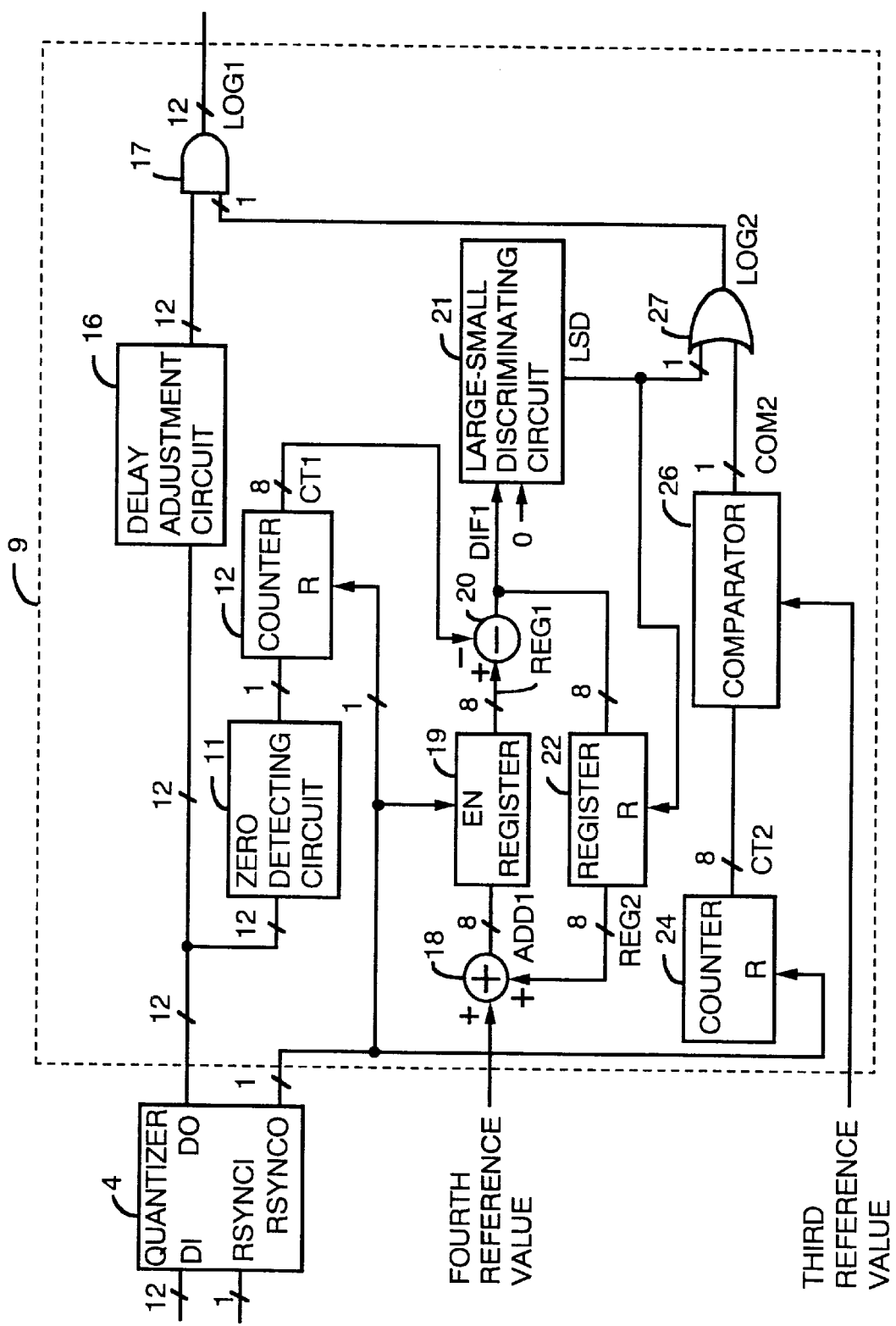
FIG. 14 shows the circuit of a data processing portion for counting the DCT coefficient values other than 0 after quantization and for effectively controlling the code volume according to a seventh embodiment of the present invention.

FIG. 14 shows a data processor 9 of the image coding apparatus according to a seventh embodiment of the present invention. The data processor 9 counts the AC coefficients other than zeros within the DCT coefficients after the quantization performed by the quantizer 4, and effectively controls the volume of coding. The data processor 9 of FIG. 14 comprises a zero detector 11, a counter 12, a delay adjustment circuit 16, a first logic circuit 17, an adder 18, a first register 19, a subtractor 20, a second register 22, a large-small discriminating circuit 21, a second counter 24, a comparator 26, and a second logic circuit 27.

The operation of the image coding apparatus of the present invention is explained below using FIG. 1 and FIG. 14. First of all, the discrete cosine transformer 2 carries out the two dimensional discrete cosine transformation for every component image comprising 8×8 pixels, and, as a result, 64 DCT coefficients Suv are obtained. The 64 DCT coefficients Suv are transmitted to the zigzag converter 3, and rearranged from a serial order to a zigzag order. The 64 DCT coefficients Suv rearranged in the zigzag order are input to the quantizer 4. The quantizer 4 divides the DCT coefficients Suv by the value Quv of the quantizing table 5. The first of the 64 coefficients Ruv, which are rearranged in the zigzag order and quantized, is a DC (direct current) coefficient, and the second to the sixty-fourth coefficients are AC (alternating current) coefficients. The quantizer 4 outputs an RSYNCO (synchronous out) signal synchronized with the output of the DC coefficients. The zero detecting circuit 11 determines if the AC (alternating current) coefficients in the coefficients Ruv output from the quantizer 4 are zero data or not. When AC coefficients are not zero data, the zero detecting circuit 11 outputs a detecting signal DET0. Zero data means that the bits comprising the AC coefficients are all zero. The counter 12 counts the AC coefficients which are not zero within the coefficients Ruv for every block (for example, 8×8=64 pixels). The initial count (CT1) of the counter 12 is zero.

The first register 19 temporarily stores the output from the adder 18 in synchronization with the RSYNCO signal. At the initial state, the first register 19 stores the forth reference value. The subtractor 20 subtracts the count of the counter 12 (CT1) from the value (REG1) of the first register 19. The second register 22 temporarily stores the output value of the subtractor 20. The adder 18 adds the fourth reference value and the value of the second register 22, and outputs the result (ADD1). When the output value (DIF1) of the subtractor 20 is equal to or smaller than zero, in other words the count of the counter 12 (CT1) exceeds the value of the first register 19 (REG1)(CT1>REG1), the large-small discriminating circuit 21 outputs the logic "L" signal. When the output value of the subtractor 20 exceeds zero, in other words the value of the counter 12 (CT1) is equal to or smaller than the value (REG1) of the first register (CT1≦REG1), the large-small discriminating circuit 21 outputs the logic "H". The register 16 for delay adjustment temporarily stores the coefficients Ruv for the purpose of delay adjustment.

The second counter 24 counts the data currently output from the quantizer 4 for every block (for example, 8×8 pixels) by counting the number of the clocks. The second comparator 26 compares the third reference count with the value of the second counter 24. When the count of the second counter 24 is equal to or smaller than the third reference value, the second comparator 26 outputs the logic "L". When the count of the second counter 24 exceeds the third reference value, the comparator 26 outputs the logic "H". The third reference value corresponds to the predetermined accumulated number of the clock pulses (for example, the third reference value is 58), that is, a certain number in the coefficients Ruv arranged in the zigzag order.

The output (LSD) of the large-small discriminating circuit 21 and the output (COM2) of the second comparator 26 are input to the second logic circuit 27. The second logic circuit 27 performs an OR logic function. When both of the output (LSD) of the large-small discriminating circuit 21 and the output (COM2) of the second comparator 26 are the logic "L", the logic circuit 27 outputs the logic "L". In response to the logic "L" output from the logic circuit 27, all the outputs from the first logic circuit 17 are replaced by zeros. When the output from the logic circuit 27 is logic "H", the output of the quantizer 4 passes through the logic circuit 17 via the delay adjustment circuit 16. This logic circuit 17 may also be constructed of switches, as mentioned above in the first embodiment. The delay adjustment circuit 16 temporarily stores the DCT coefficients Ruv for the purpose of delay adjustment. The output data group is transmitted to the entropy coder 6 as required, and the entropy coder 6 Huffman codes the data group.

FIGS. 15A~15I are timing charts explaining an operation of the data processing circuit of FIG. 14. FIG. 15A shows a clock signal (CLK) used in the data processor 9, FIG. 15B shows the RSYNCO signal output from the quantizer 4, FIG. 15C shows the stream DO of the DCT coefficients Ruv output from the quantizer 4, FIG. 15D shows the count (CT1) of the counter 12, FIG. 15E shows the output value (LSD) of the large-small discriminating circuit 21, FIG. 15F shows the count (CT2) of the counter 24, FIG. 15G shows the output (COM2) of the second comparator 26, FIG. 15H shows the output (LOG2) of the second logic circuit 27, and FIG. 15I shows the DCT coefficients Ruv (LOG1) output from the logic circuit 17.

The RSYNCO signal is a pulse output in synchronization with the DC coefficient of the DCT coefficients Suv, and used as a reset signal for the counter 12. A DO signal output comprises a DC coefficient preceding the 63 AC coefficients in the zigzag order. As explained for FIG. 19, the AC coefficients other than zero are transmitted at first, but the latter portions of the AC coefficients tend to consist of more zeros. The present invention utilizes this feature, that is, in the DCT coefficients in the zigzag order, the latter portion of the DCT coefficients contains more zeros. The present invention reduces the volume of transmitted data by replacing the AC coefficients with zeros in the latter portion of the DCT coefficients.

On the contrary, when the count of the counter 12 does not reach a predetermined value, it is not necessary to replace the AC coefficients with zeros. Therefore, in such cases, the predetermined reference value is changed by adding the count which did not reach the predetermined reference value to the following reference value. Thus, it is possible to reduce the volume of data being rounded down. In the seventh embodiment, the data processing circuit 9 includes a circuit for changing the predetermined reference value according to the count value of the counter 12. The circuit for achieving such a function includes the adder 18, the first register 19, the second register 22 and the subtractor 20. In the fourth embodiment, the data processing circuit 9 includes a circuit for changing the predetermined reference value according to the count value of the counter 12. The circuit for achieving such a function includes the adder 18, the first register 19, the second register 22, the subtractor 20, and the large-small discriminating circuit 21.

An operation of the data processing circuit according to FIGS 15A~15I is explained below.

In order to simplify the explanation, it is assumed here that the output signal DO from the quantizer 4 is arranged in the order of DC, *, *, 0, *, *, *, * *, 0, . . . 0,* . . . *0, 0, DC, *, *, *, 0, . . . as shown in FIG. 11C. "DC"s indicate the DC coefficients, the "*" marks indicate the AC coefficients which are not zero and "0"s indicate the AC coefficients which are zero. The zero detecting circuit 11 detects the AC coefficients which are not zero and outputs the detected number as DET0 to the counter 12. This DET0 is a pulse output when "*" AC coefficient which is not zero is detected, and is not shown in FIGS. 15A~15I. When the counter 12 receives the DET0 pulse from the zero detecting circuit 11, the counter 12 increments the count, and accumulates the count CT1 as shown in FIG. 15D. The RSYNCO signal output in synchronization with the DC coefficients resets the counter 12 for every 8×8=64 pixels.

The first register 19 stores the fourth reference value (in the seventh embodiment, for example, 6). The first register 19 operates and outputs the stored value when the RSYNCO signal is input (REG1). The subtractor 20 subtracts the count (CT1) of the counter 12 from the value (REG1) of the first register 19, and sends the resultant value (DIF1) to the second register 22 and stores it. The subtractor 20 outputs the resultant value (DIF1) to the large-small discriminating circuit 21.

The relationship between the transition of the stored value (REG1) of the first register 19 and the output (LSD) from the large-small discriminating circuit 21 is explained below. At the initial state, the fourth reference value, for example, 6 here, is stored in the first register 19. Therefore, the value of the output (REG1) from the first register 19 becomes 6. The subtractor 20 subtracts the count CT1 of the counter 12 from the output (REG1) of the first register 19, and outputs the resultant signal DIF1. At this time, the value of REG1 is changed only when the RSYNCO signal is input, and after time, that value is maintained. The count CT1 of the counter 12 is incremented for every clock pulse, and compared with REG1, and DIF1 is output from the subtractor 20 for every clock pulse. This DIF1 is stored in the second register 22, but readout is brought about by the RSYNCO signals. This value of the register 22 is cleared to zero when the output of the large-small discriminating circuit 21 is "L" (when the DIF1 is equal to or smaller than zero). The adder 18 adds the fourth reference value and the output signal REG2 of the second register 22 every time the RSYNCO signal is input, and the register 19 increments the result ADD1.

The output DIF1 of the subtractor 20 is input to the large-small discriminating circuit 21. When the value of the DIF1 is smaller than zero, in other words the count CT1 of the counter 12 exceeds the value REG1 of the first register 19, the large-small discriminating circuit 21 outputs the logic "L" signal. On the contrary, when the value of the DIF1 is equal to or larger than zero, in other words the count CT1 of the counter 12 is equal to or smaller than the value REG1 of the register 19, the large-small discriminating circuit 21 outputs the "H" signal.

On the contrary, the second counter 24 continues to count the clocks (CT2) until the second counter 24 is reset by the RSYNCO signal from the quantizer 4 as shown in FIG. 15F. That is, since the RSYNCO signal is output for every 64 clocks, the clock is accumulated to a maximum value of 64. After the count of the second counter 24 increases to 63, the count is reset by the RSYNCO signal. Then the accumulation value returns to zero, and the clocks are again counted from zero to 63 in sequence. This count indicates the number of the data which is currently output from the quantizer 4 for every block (for example, 8×8 pixels). The second comparator 26 compares the third reference value with the count of the second counter 24. If the count of the second counter 24 is equal to or smaller than the third reference value, the second comparator 26 outputs the logic "L". If the count of the second counter 24 exceeds the third reference value, the second comparator 26 outputs the logic "H" (COM2), as shown in FIG. 15G. The third reference value corresponds to the predetermined accumulated number of the clocks (for example, the third reference value is 58), that is, a certain number in the coefficients Ruv arranged in the zigzag order.

The output (LSD) of the large-small discriminating circuit 21 and the output (COM2) of the second comparator 26 are input into the second logic circuit 27. The second logic circuit 27 performs an OR logic operation. When both of the output (LSD) of the large-small discriminating circuit 21 and the output (COM2) of the second comparator 26 are the logic "L", the logic circuit 27 outputs the logic "L". In response to the logic "L" output from the logic circuit 27, all the outputs from the first logic circuit 17 are replaced by zeros. In the other cases, that is, the output from the logic circuit 27 is logic "H", the output of the quantizer 4 passes through the logic circuit 17 via the delay adjustment circuit 16. This logic circuit 17 may also be constructed with switches, as mentioned above for the first embodiment. The delay adjustment circuit 16 temporarily stores the DCT coefficients Ruv for the purpose of delay adjustment. The output data group is transmitted to the entropy coder 6 as required, and the entropy coder 6 Huffman codes the data group.

As explained above, when the output of the second logic circuit 27 is the logic "L", the DO signal output from the quantizer 4 is replaced by "0". Therefore, it is possible to reduce the volume of data to be entropy coded in the entropy coder 6 of the succeeding stage. Furthermore, it is possible to adjust the predetermined fourth reference value to an appropriate reference value every time the RSYNCO signal arrives by constantly comparing the count CT1 of the counter 12 and the REG1 of the first register 19, and by transferring the content of the first register 19 according to the result of the comparison. Since the adjustment of the fourth reference value becomes possible, it also becomes possible to add the count which did not reach the predetermined reference value to the next reference value. By changing the reference value to the larger value, the AC coefficients which are not zero can be reduced, even though those AC coefficients had been rounded down, and the volume of data being rounded down can be reduced.

Embodiment 8

Figure 16:
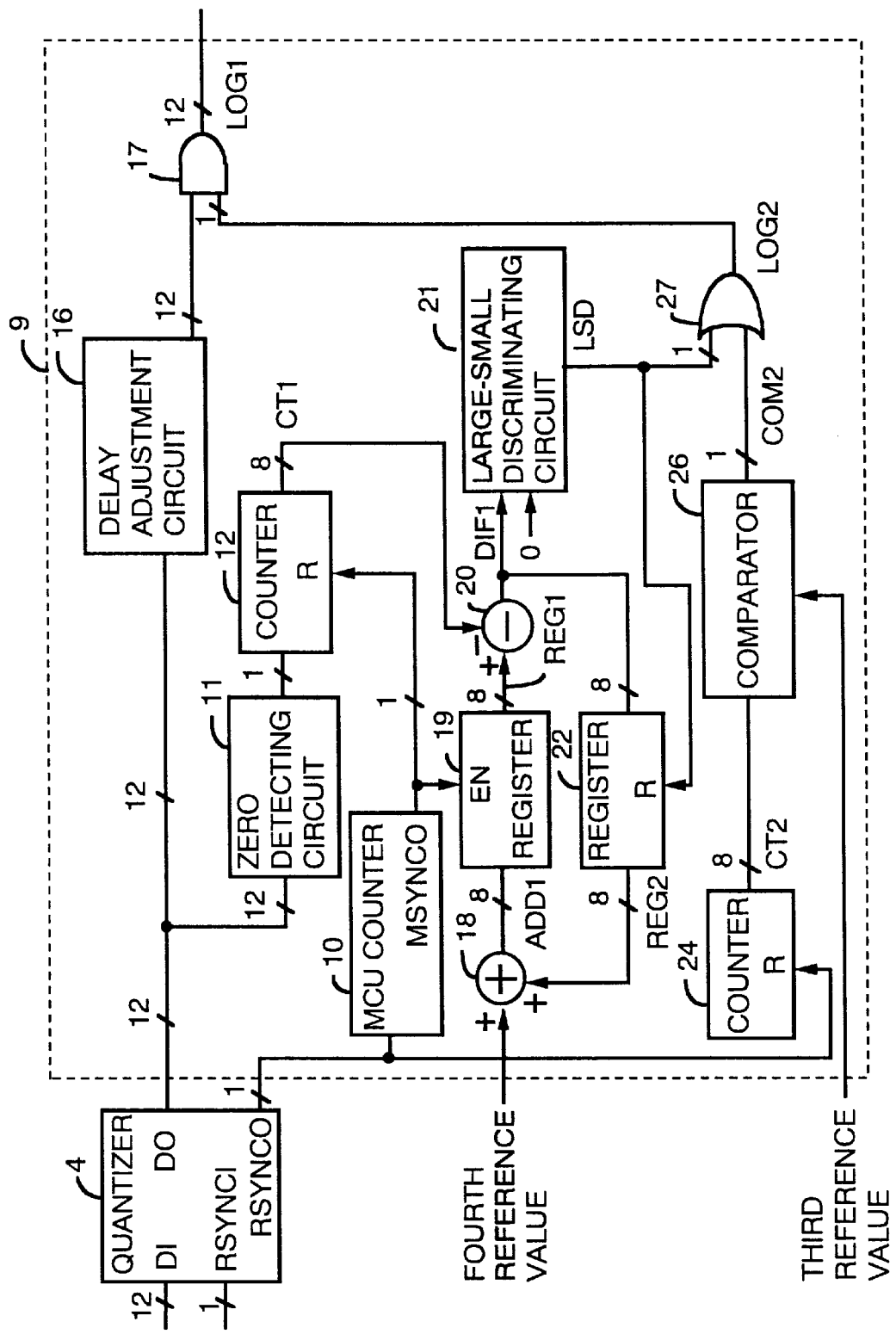
FIG. 16 shows the circuit of a data processing portion for counting the DCT coefficient values other than 0 after quantization and for effectively controlling the code volume according to a eighth embodiment of the present invention.
Figure 18:
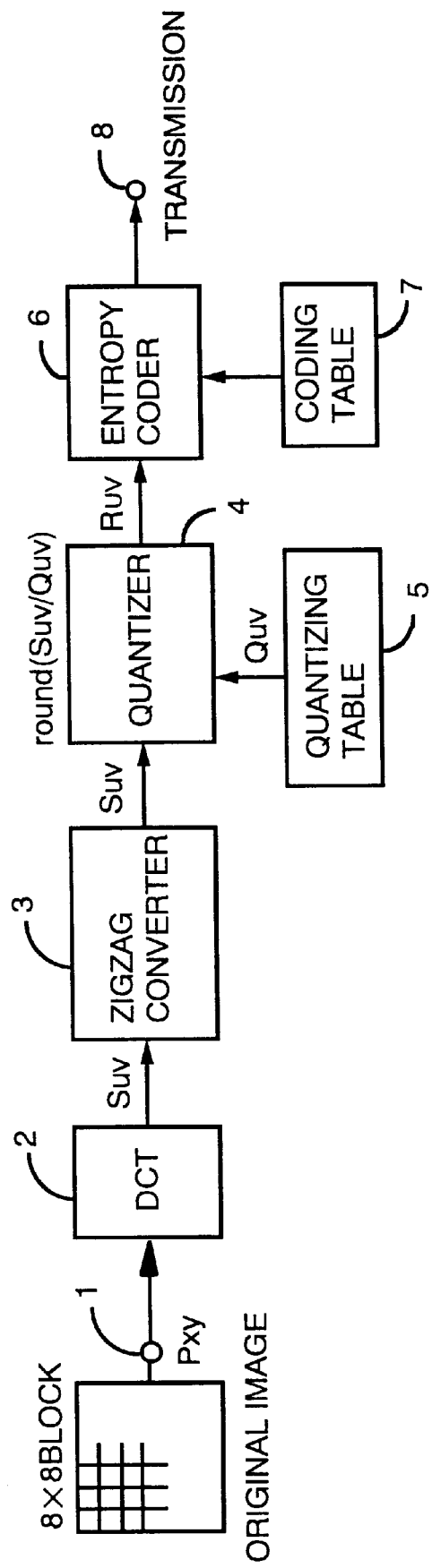
FIG. 18 is a basic block diagram showing a conventional image coding apparatus.

FIG. 16 shows a data processor 9 of the image coding apparatus according to a ninth embodiment of the present invention. The data processor 9 counts the number of AC coefficients, other than zero, within the DCT coefficients after the quantization performed by the quantizer 4, and effectively controls the coding amount. The data processor 9 of FIG. 16 comprises a zero detector 11, a counter 12, an MCU counter 10, a delay adjustment circuit 16, a first logic circuit 17, an adder 18, a first register 19, a subtractor 20, a large-small discriminating circuit 21, a second register 22, a second counter 24, a comparator 26, and a second logic circuit 27.

The operation of the image coding apparatus of the present invention is explained below using FIG. 1 and FIG. 16. First of all, the discrete cosine transformer 2 carries out two dimensional discrete cosine transformation for every component image comprising 8×8 pixels, and, as a result, 64 DCT coefficients Suv are obtained. The 64 DCT coefficients Suv are transmitted to the zigzag converter 3, and rearranged from a serial order to a zigzag order. The 64 DCT coefficients Suv rearranged in the zigzag order are input to the quantizer 4. The quantizer 4 divides the DCT coefficients Suv by the value Quv of the quantizing table 5. The first of the 64 coefficients Ruv, which are rearranged in the zigzag order and quantized, is a DC (direct current) coefficient, and the second to the sixty-fourth coefficients are AC (alternating current) coefficients. The quantizer 4 outputs an RSYNCO (synchronous out) signal synchronized with the output of the DC coefficients. The MCU counter 10 counts the number of the blocks (for example, 8×8 pixels), and outputs an MSYNCO signal for every head portion of the MCU, which is a basic unit of the process. Examples of the MCUs (Minimum Coded Units) are YUV, YYUV and YYYYUV.

Y represents a intensity signal and an UV represents a color difference signal. The eighth embodiment, in which these MCUs are used, is applied in a situation where, for example, the intensity Y is more significant than the color difference signal UV. In other words, the sixth embodiment is applied where the intensity signal Y needs to be transmitted without change as much as possible, and the AC components of the color difference signal UV can be replaced by zero, since human eyes are characterized by sensitivity to intensity signal.

In FIG. 16, the zero detecting circuit 11 determines if the DCT coefficients Ruv output from the quantizer 4 are zero data, and outputs a detecting signal DET0 if the Ruv are not zero. The counter 12 counts the AC coefficients in the coefficients Ruv, which are not zero, for every MCU. The first register 19 temporarily stores the output of the adder 18 in synchronization with the MSYNCO signal. The subtractor 20 subtracts the count of the counter 12 (CT1) from the value of the first register 19 (REG1). The second register 22 temporarily stores the output value of the subtractor 20. This value of the register 22 is cleared to zero when the output of the large-small discriminating circuit 21 is "L" (when the DIF1 is smaller than zero). The adder 18 adds the fourth reference value and the value of the second register 22 (REG2). Initially, the first register 19 stores the value of the fourth reference value. The large-small discriminating circuit 21 outputs the logic "L", when the output value of the subtractor 20 is smaller than zero, that is, when the count (CT1) of the counter 12 exceeds the first value (REG1) of the first register 19. The large-small discriminating circuit 21 outputs the logic "H", when the output value of the subtractor 20 is equal to or smaller than zero, that is, the value of the first counter 12 is equal to or smaller than the value of the first register 19.

The second counter 24 counts the number of the data which is currently output from the quantizer 4 for every block (for example, 8×8 pixels) by counting the number of the clocks. The second comparator 26 compares the third reference value with the value of the second counter 24. When the count of the second counter 24 is equal or smaller than the third reference value, the second comparator 26 outputs the logic "L". When the count of the second counter 24 exceeds the third reference value, the comparator 26 outputs the logic "H". The third reference value corresponds to a predetermined accumulated number of the clocks (for example, the third reference value is 58), that is, a certain number in the coefficients Ruv arranged in the zigzag order.

The output (LSD) of the large-small discriminating circuit 21 and the output (COM2) of the second comparator 26 are input into the second logic circuit 27. The second logic circuit 27 performs an OR operation. When both of the output (LSD) of the large-small discriminating circuit 21 and the output (COM2) of the second comparator 26 are the logic "L", the logic circuit 27 outputs the logic "L". In response to the logic "L" output from the logic circuit 27, all the outputs from the first logic circuit 17 are replaced by zeros. When the output from the logic circuit 27 is logic "H", the output of the quantizer 4 passes through the logic circuit 17 via the delay adjustment circuit 16. This logic circuit 17 may also be constructed with switches, as mentioned above for the first embodiment. The delay adjustment circuit 16 temporarily stores the DCT coefficients Ruv for the purpose of delay adjustment. The output data group is transmitted to the entropy coder 6 as required, and the entropy coder 6 Huffman codes the data group. The logic circuit 17 may also be constructed with switches, just as mentioned for the first embodiment.

FIGS. 17A~17J are timing charts explaining an operation of the data processing circuit of FIG. 16. FIG. 17A shows a clock signal (CLK) used in the data processor 9, FIG. 17B shows the RSYNCO signal output from the quantizer 4, FIG. 17C shows the MSYNCO signal output from the MCU counter 10, FIG. 17D shows the stream DO of the DCT coefficients Ruv output from the quantizer 4, FIG. 17E shows the output value (CT1) of the counter 12, FIG. 17F shows the output value (LSD) of the large-small discriminating circuit 21, FIG. 17G shows the count value (CT2) of the counter 24, FIG. 17H shows the output (COM2) of the second comparator 26, FIG. 17I shows the output (LOG2) of the second logic circuit 27, and FIG. 17J shows the DCT coefficients Ruv (LOG1) output from the logic circuit 17.

The RSYNCO signal is a pulse output in synchronization with the DC coefficient of the DCT coefficients Suv. The MCU counter 10 counts the RSYNCO signal. For example, since FIG. 17D assumes that the unit of the MCU is YUV, the count of the RSYNCO signals in the MCU counter 10 corresponds to the number of YUV, that is, 3. Therefore, the reset pulse MSYNCO signal is generated for every 64 pixels×3 as shown in FIG. 17C. If it is assumed that the unit of the MCU is YYYYUV, the count of the MCU counter 10 is 6. In this case, the reset pulse MSYNCO signal is generated for every 64 pixels×6.

A DO signal output comprises one DC coefficient and the succeeding 63 AC coefficients in the zigzag order. As explained in FIG. 19, the AC coefficients other than zero are transmitted at the beginning, but the latter portions of the AC coefficients tend to consist of more zeros. The invention of the second embodiment utilizes this feature, that is, in the DCT coefficients of the MCU unit in the zigzag order, the latter portion of the DCT coefficients is less significant. The present invention reduces the volume of transmitted data by replacing the AC coefficients with zeros in the latter portion of the DCT coefficients. In this case, the DC coefficient is not replaced by zero. In the second embodiment, at least the DC coefficient is left so that the information about the color difference signal UV portion is not lost.

In order to simplify the explanation, it is assumed here that the output signal DO from the quantizer 4 is arranged in the order of DC, *, *, 0, 0, *, 0, . . . 0,* . . . * 0, 0, DC, *, *, *, 0, . . . as shown in FIG. 17D. "DC"s indicate the DC coefficients, the "*" marks indicate the AC coefficients which are not zero and "0"s indicate the AC coefficients which are zero. The zero detecting circuit 11 detects the AC coefficients which are not zero, and outputs the detected number as DET0 to the counter 12. This DET0 is a pulse output when "*" mark is detected, but it is not shown in FIGS. 17A~17J. When the counter 12 receives the DET0 pulse from the zero detecting circuit 11, the counter 12 increments the count, and accumulates the count CT1 as shown in FIG. 17E. The MSYNCO signal output in synchronization with the DC coefficients resets the counter 12 for every 64 pixels×3. In FIG. 17C, the number for resetting is generally represented as 64 pixels×n. The eighth embodiment is a specific case of n=3.

The first register 19 stores the fourth reference value (in the eighth embodiment, for example, 6). The first register 19 operates and outputs the stored value when the RSYNCO signal is input (REG1). The subtractor 20 subtracts the count of the counter 12 (CT1) from the value of the first register 19 (REG1), and sends the resultant value (DIF1) to the second register 22 where it is stored. While the subtractor 20 outputs the resultant value (DIF1) to the large-small discriminating circuit 21. However, when the output of the large-small discriminating circuit 21 is "L" (when DIF1 is equal or smaller than zero), the value stored in the second register 22 is cleared to zero.

The relationship between the transition of the stored value (REG1) of the first register 19 and the output (LSD) from the large-small discriminating circuit is explained below. Initially, the fourth reference value, for example value 11 here, is stored in the first register 19. Therefore, the value of the output (REG1) from the first register 19 becomes 11. The subtractor 20 subtracts the count CT1 of the counter 12 from the output (REG1) of the first register 19, and outputs the signal DIF1. At this time, the value of REG1 is changed only when there is an input of the MSYNCO signal, and after the time, the value is maintained. The count CT1 of the counter 12 is incremented for every clock pulse (CLK), compared with REG1, and DIF1 is output for respective clocks. This DIF1 is stored in the second register 22, but readout is brought about by the RSYNCO signals. The adder 18 adds the fourth reference value and the output signal REG2 of the second register 22 every time the MSYNCO signal is input, and the register 19 increments the result ADD1.

The output DIF1 of the subtractor 20 is input to the large-small discriminating circuit 21. When the value of the DIF1 is smaller than zero, in other words, the count CT1 of the counter 12 exceeds the value REG1 of the first register 19, the large-small discriminating circuit 21 outputs the logic "L" signal. On the contrary, when the value of the DIF1 is equal to or larger than zero, in other words, the count CT1 of the counter 12 is equal to or smaller than the value REG1 of the register 19, the large-small discriminating circuit 21 outputs the "H" signal.

The second counter 24 continues to count the clocks (CT2) until the second counter 24 is reset by the RSYNCO signal from the quantizer 4 as shown in FIG. 15G. That is, since the RSYNCO signal is output for every 64 clocks, the clock is counted until reaching the maximum value of 64. After the count of the second counter 24 increases to 63, the accumulation value is reset by the RSYNCO signal. Then the accumulation value returns to zero, and the clocks are again counted from zero to 63 in sequence. This count indicates the number of the data currently output from the quantizer 4 for every block (for example, 8×8 pixels). The second comparator 26 compares the third reference value with the count of the second counter 24. If the count of the second counter 24 is equal to or smaller than the third reference value, the second comparator 26 outputs the logic "L". If the count of the second counter 24 exceeds the third reference value, the second comparator 26 outputs the logic "H" (COM2), as shown in FIG. 17H. The third reference value corresponds to a predetermined accumulated number of the clocks (for example, the third reference value is 58), that is, a certain number in the coefficients Ruv arranged in the zigzag order.

The output (LSD) of the large-small discriminating circuit 21 and the output (COM2) of the second comparator 26 are input into the second logic circuit 27. The second logic circuit 27 performs an OR logic operation. When both of the output (LSD) of the large-small discriminating circuit 21 and the output (COM2) of the second comparator 26 are the logic "L", the logic circuit 27 outputs the logic "L". In response to the logic "L" output from the logic circuit 27, all the outputs from the first logic circuit 17 are replaced by zeros. Otherwise, the output from the logic circuit 27 is logic "H", the output of the quantizer 4 passes through the logic circuit 17 via the delay adjustment circuit 16. This logic circuit 17 may also be constructed with switches, as mentioned above for the first embodiment. The delay adjustment circuit 16 temporarily stores the DCT coefficients Ruv for the purpose of delay adjustment. The output data group is transmitted to the entropy coder 6 as required, and the entropy coder 6 Huffman codes the data group.

As explained above, during the time when the output of the second logic circuit 27 is the logic "L", the DO signal output from the quantizer 4 are replaced by "0". Therefore, it is possible to reduce the volume of data to be entropy coded in the entropy coder 6 of the succeeding stage. Furthermore, since the adjustment of the fourth reference value becomes possible, it also becomes possible to add the amount which did not reach the predetermined reference value to the next reference value. By changing the reference value to the larger value, the AC coefficients which are not zero can be saved, even though those AC coefficients had been rounded down, and the volume of data rounded down can be reduced.

In the eighth embodiment, all Y signal portions pass through the logic circuit 17, some of the U signals are replaced by zeros, and all the V signal portions except the DC coefficient portions are replaced by zeros. In this eighth embodiment, although the larger significant Y signals all pass through the logic circuit 17 to reduce the volume of the coding data as a whole, the coding quality improves. During the time when the output from the comparator 15 is the logic "L", the DO signal output from the quantizer 4 is replaced by 0. Therefore, the volume of data for entropy coding in the entropy coder 6 of the next stage can be reduced.

What is claimed is:

1. An image coding apparatus for compressing image data comprising:

data processing means for counting quantized AC coefficients that are not zero, for outputting portions of the quantized AC coefficients that are not zero without change, or for replacing the quantized AC coefficients with zero based on the counting, and outputting a result, thereby reducing the quantized AC coefficients that are not zero, the data processing means comprising:

a zero detecting circuit for determining whether the quantized AC coefficients are zero;

a first counter, that is reset periodically, for counting the quantized AC coefficients that are not zero and outputting a count;

a first comparator for comparing the count of the first counter and a first reference value, and outputting an AC coefficient eliminating signal when the count of the first counter exceeds the first reference value; and a first logic circuit for replacing the quantized AC coefficients with zero based on the AC coefficient eliminating signal, thereby reducing quantized AC coefficients that are not zero.

2. The image coding apparatus according to claim 1, the data processing means comprising an MCU counter for supplying a reset signal to the first counter.

3. The image coding apparatus according to claim 1, wherein the data processing means comprises:

a second counter, that is reset periodically, for counting a clock signal and outputting a count;

a second comparator for comparing the count of the second counter and a second reference value and for outputting an AC coefficient hold signal when the count of the second counter exceeds the second reference value; and a second logic circuit for preventing the AC coefficient eliminating signal received from the first comparator from passing when the second comparator outputs the AC coefficient hold signal, wherein the first logic circuit forcibly replaces the quantized AC coefficients with zero only when the AC coefficient hold signal is not output and the AC coefficient eliminating signal is output, and AC coefficients are not eliminated when the AC coefficient hold signal is output.

4. The image coding apparatus according to claim 3, the data processing means comprising an MCU counter for supplying a reset signal to the first counter.

5. An image coding apparatus for compressing image data comprising:

data processing means for counting quantized AC coefficients that are not zero, for outputting portions of the quantized AC coefficients that are not zero without change, or for replacing the quantized AC coefficients with zero based on the counting, and outputting a result, thereby reducing the quantized AC coefficients that are not zero, wherein the data processing means comprises:

a zero detecting circuit for determining if the quantized AC coefficients are zero;

a first counter, that is reset periodically, for counting the quantized AC coefficients that are not zero and outputting a count;

a first register for temporarily storing a first reference value;

a subtractor for subtracting the count of the first counter from the first reference value stored in the first register to produce a difference;

a second register for temporarily storing the difference;

an adder for adding the difference stored in the second register to a second reference value to produce a sum and for sending the sum to the first register;

a large-small discriminating circuit for outputting an AC coefficient eliminating signal when the difference is negative; and a first logic circuit for forcibly replacing the quantized AC coefficients with zero based on the AC coefficient eliminating signal from the large-small discriminating circuit.

6. The image coding apparatus according to claim 5, wherein the data processing means comprises an MCU counter for supplying a reset signal to the first counter.

7. The image coding apparatus according to claim 5, wherein the data processing means comprises:

a second counter, that is reset periodically, for counting a clock signal and for outputting a count;

a comparator for comparing the count of the second counter and a third reference value and for outputting an AC coefficient hold signal when the count of the second counter exceeds the third reference value; and a second logic circuit for preventing the AC coefficient eliminating signal received from the large-small discriminating circuit from passing when the comparator outputs the AC coefficient hold signal, wherein the first logic circuit forcibly replaces the quantized AC coefficients with zero only when the AC coefficient hold signal is not output and the AC coefficient eliminating signal is output, and the quantized AC coefficients are not eliminated when the AC coefficient hold signal is output.

8. The image coding apparatus according to claim 7, wherein the data processing means comprises an MCU counter for supplying a reset signal to the first counter.

9. An image coding apparatus comprising:

a cosine transformer for discrete cosine transforming every pixel of an image to produce discrete cosine transformed coefficients;

a zigzag converter for rearranging block data of the image from a serial order to a zigzag order;

a quantizer for linearly quantizing the discrete cosine transformed coefficients utilizing a quantization step size varying for respective coefficient positions and outputting linearly quantized coefficients;

an entropy coder for entropy coding the linearly quantized coefficients using Huffman coding; and data processing means for counting quantized AC coefficients that are not zero, for outputting portions of the quantized AC coefficients that are not zero without change, or for replacing the quantized AC coefficients with zero based on the counting, and outputting a result, thereby reducing the quantized AC coefficients that are not zero, the data processing means comprising:

a zero detecting circuit for determining if the quantized AC coefficients are zero;

a first counter, that is reset periodically, for counting the quantized AC coefficients that are not zero and outputting a count;

a first comparator for comparing the count of the first counter and a first reference value, and outputting an AC coefficient eliminating signal when the count of the first counter exceeds the first reference value; and a first logic circuit for forcibly replacing the quantized AC coefficients with zero based on the AC coefficient eliminating signal, thereby reducing the quantized AC coefficients that are not zero.

10. The image coding apparatus according to claim 9, the data processing means comprising an MCU counter for supplying a reset signal to the first counter.

11. The image coding apparatus according to claim 9 wherein the data processing means comprises:

a second counter, that is reset periodically, for counting a clock signal an outputting a count;

a second comparator for comparing the count of the second counter and a second reference value and for outputting an AC coefficient hold signal when the count of the second counter exceeds the second reference value; and a second logic circuit for preventing the AC coefficient eliminating signal received from the first comparator from passing when the second comparator outputs the AC coefficient hold signal, wherein the first logic circuit forcibly replaces the quantized AC coefficients with zero only when the AC coefficient hold signal is not output and the AC coefficient eliminating signal is output, and data of the quantized AC coefficients are not eliminated when the AC coefficient hold signal is output.

12. The image coding apparatus according to claim 11, the data processing means comprising an MCU counter for supplying a reset signal to the first counter.

13. An image coding apparatus comprising:

a cosine transformer for discrete cosine transforming every pixel of an image to produce discrete cosine transformed coefficients;

a zigzag converter for rearranging block data of the image from a serial order to a zigzag order;

a quantizer for linearly quantizing the discrete cosine transformed coefficients utilizing a quantization step size varying for respective coefficient positions and outputting linearly quantized coefficients;

an entropy coder for entropy coding the linearly quantized coefficients using Huffman coding; and data processing means for counting quantized AC coefficients that are not zero, for outputting portions of the quantized AC coefficients that are not zero without change, or for replacing the quantized AC coefficients with zero based on the counting, and outputting a result, thereby reducing the quantized AC coefficients that are not zero, wherein the data processing means comprises:

a zero detecting circuit for determining if the quantized AC coefficients are zero;

a first counter, that is reset periodically, for counting the quantized AC coefficients which are not zero and outputting a count;

a first register for temporarily storing a first reference value;

a subtractor for subtracting the count of the first counter from the first reference value stored in the first register to produce a difference;

a second register for temporarily storing the difference;

an adder for adding the difference stored in the second register and a second reference value to produce a sum and for sending the sum to the first register;

a large-small discriminating circuit for outputting an AC coefficient eliminating signal when the difference is negative; and a first logic circuit for forcibly replacing the quantized AC coefficients with zero based on the AC coefficient eliminating signal from the large-small discriminating circuit.

14. The image coding apparatus according to claim 13, the data processing means comprising an MCU counter for supplying a reset signal to the first counter.

15. The image coding apparatus according to claim 13, wherein the data processing means comprises:

a second counter, that is reset periodically, for counting a clock signal and outputting a count;

a comparator for comparing the count of the second counter and a third reference value and for outputting an AC coefficient hold signal when the count of the second counter exceeds the third reference value; and a second logic circuit for preventing the AC coefficient eliminating signal received from the large-small discriminating circuit from passing when the comparator outputs a hold signal, wherein the first logic circuit forcibly replaces the quantized AC coefficients with zero only when the AC coefficient hold signal is not output and the AC coefficient eliminating signal is output, and data of the quantized AC coefficients is not eliminated when the AC coefficient hold signal is output.

16. The image coding apparatus according to claim 15, the data processing means comprising an MCU counter for supplying a reset signal to the first counter.

* * * * *